United States Patent [19]
Barlow

[11] Patent Number: 6,143,214
[45] Date of Patent: Nov. 7, 2000

[54] MIXING AND DISPENSING SYSTEM FOR RAPIDLY POLYMERIZING MATERIALS

[75] Inventor: Joel W. Barlow, Austin, Tex.

[73] Assignee: Board of Regents of the University of Texas System, Austin, Tex.

[21] Appl. No.: 09/036,737

[22] Filed: Mar. 9, 1998

[51] Int. Cl.$^7$ ...................................................... B29B 7/74
[52] U.S. Cl. .................... 264/40.1; 264/40.6; 264/328.6; 264/328.14; 222/100; 222/102; 425/135; 425/200; 425/548; 428/447
[58] Field of Search ................................ 222/95, 97–103; 264/40.1, 40.6, 40.7, 272.11, 272.12, 328.6, 328.14, 328.17, 328.18, 349; 366/251, 273; 425/135, 143, 200, 201, 543, 548; 428/447

[56] References Cited

U.S. PATENT DOCUMENTS

| | | | |
|---|---|---|---|
| 3,327,898 | 6/1967 | Farr | ......................................... 222/100 |
| 3,902,850 | 9/1975 | Lehnert . | |
| 4,082,512 | 4/1978 | Wingard et al. . | |
| 4,108,606 | 8/1978 | Wingard . | |
| 4,313,909 | 2/1982 | Boden et al. . | |
| 4,430,287 | 2/1984 | Tilgner | .................................... 264/40.6 |
| 4,487,897 | 12/1984 | Matsuoka et al. | ......................... 526/64 |
| 4,720,424 | 1/1988 | Eickman et al. | ................... 264/272.11 |
| 4,726,933 | 2/1988 | Mayr et al. . | |
| 4,747,517 | 5/1988 | Hart | ........................................ 222/137 |
| 4,778,659 | 10/1988 | Inoue | ................................ 264/331.19 |
| 4,795,336 | 1/1989 | Shannon et al. | ......................... 425/145 |
| 5,098,626 | 3/1992 | Pas | .......................................... 264/151 |
| 5,187,001 | 2/1993 | Brew | ..................................... 264/328.6 |
| 5,240,325 | 8/1993 | Monichiero | ............................. 366/138 |
| 5,498,151 | 3/1996 | Nennecker | ................................... 425/4 |
| 5,562,883 | 10/1996 | Salisbury et al. . | |
| 5,772,953 | 6/1998 | Sambrook et al. | ...................... 264/638 |

OTHER PUBLICATIONS

Rosato, Donald V. et al., Injection Molding Handbook, 2nd edition, pp. 1020–1023, 1995.

Primary Examiner—Jill L. Heitbrink
Attorney, Agent, or Firm—Taylor Russell & Russell, P.C.

[57] ABSTRACT

A mixing and dispensing system for reactively combining organic chemical components to produce a rapidly polymerizing material for use in molding and encapsulating small and usually delicate devices, such as electronic components. The system uses a novel mix head incorporating a high speed rotary mixer having magnetic coupling for mixing and injecting relatively low viscosity polymerizing materials into a mold. The chemical feed to the mix head is from special chemical handling equipment. The design of the system eliminates the need for material control valves and enables relatively low feed line pressures. A novel chemical handling subsystem uses special tubular containers provided by the chemical material manufacturers that mount on specially designed dispensing equipment, and do not require special storage, handling, or mixing by trained personnel. The system has a mold cycle time of typically between 6 and 12 seconds in order to achieve complete polymerization, eliminating the need for curing ovens required in conventional encapsulation methods. The chemicals used in this system are not premixed, but are combined in the mix head just prior to filling a mold. They may be stored almost indefinitely if properly sealed. Because of the relatively low viscosity of the rapidly polymerizing materials, damage to fragile electronic interconnections during encapsulation are greatly reduced. Other advantages of this system is no inherent corrosion problems, lower moisture absorption than epoxy, and lower mold temperatures for reduced thermal stresses.

49 Claims, 10 Drawing Sheets

MIXING AND DISPENSING SYSTEM FOR RAPIDLY POLYMERIZING MATERIALS

BACKGROUND

The field of the invention relates generally to encapsulation of relatively fragile devices such as electronic components and, more particularly, to a system, process, and a product made by the generic process of rapid injection molding. The system has no slurry valves, a novel mix head with improved slurry handling, a high intensity mixer, and novel chemical handling and dispensing mechanisms.

The system described herein is designed to meter, mix, and initiate chemical and chemical slurry streams for reaction injection molding of small parts. While encapsulation of electronics circuits and discrete components is the primary intended use of this technology, it could also be used in other applications, such as the making of small parts to replace transfer compression moldings made of other filled or fiber reinforced thermosetting materials such as epoxy, phenolics, and alkyds.

Conventional electronic component encapsulation methods use epoxy transfer molding that require relatively slow mold cycle times of 60 to 120 seconds followed by relatively long oven curing times of 2 to 4 hours. These long time intervals are dictated by the rate of polymerization of the premixed materials, the rate of which is set to a low value to provide a reasonable shelf life, and to allow for mixing time by the compounder and handling time by the end user. The need for the long oven curing times is to ensure complete polymerization. Damage to fragile electronic interconnections sometimes results from conventional encapsulation methods when the material viscosity becomes excessive due to improper storage conditions. It is also necessary to remove residual corrosive materials from the epoxy, which greatly increases the cost of its manufacture. Moisture absorption is another potential problem with epoxy materials used in conventional electronic component encapsulation methods. These methods also require a relatively high mold temperature which can lead to thermal stresses in the encapsulating package.

For the foregoing reasons, there is a need, therefore for an encapsulating system that provides a short mold cycle time with no required oven curing, provides mixing of reactive materials just prior to injecting the materials into a mold, provides chemical material handling capability that requires no special storage, handling, or mixing by trained personnel, eliminates damage to fragile electronic interconnections caused by excessive material viscosity, eliminates the need for removing corrosive byproducts in the chemical components, reduces moisture absorption in the encapsulated product, and reduces thermal stresses in the encapsulated product.

SUMMARY

The current invention addresses these problems with a novel Reaction Injection Molding (RIM) system for handling and dispensing improved materials to a mold. The RIM process that is the subject of the present disclosure uses highly reactive liquid components which are metered from special separate storage containers and mixed just prior to entering a mold cavity where they rapidly polymerize to form a solid material. This invention is designed particularly for small parts and small shot sizes. Whereas typical mold cycle times for conventional epoxy transfer molding technology are between 60 and 120 seconds, the present invention is capable of achieving complete polymerization in less than 10 seconds. Increasing the polymerization rate by a factor of ten relative to conventional technology substantially reduces the tooling cost per part molded.

Conventional transfer molding techniques use chemical reactants that are premixed at the factory and supplied to the customer in a "frozen" molecular state to retard premature reaction. While this approach to chemical handling guarantees reactant composition, it has several drawbacks. First, the premixed reactants must be kept refrigerated to prevent reaction that could render the material unfit for use. The rate of polymerization of the premixed epoxy must be set deliberately low to permit reasonable shelf life, mixing time by the compounder, and handling time by the end user. This compromise is largely responsible for the slow mold cycle times and extensive post mold times in curing ovens of between two and four hours. In contrast, in the present invention the RIM reactants are stored separately at ambient temperatures as low viscosity liquids. These RIM reactants can be stored indefinitely, provided the storage containers are properly sealed to prevent contamination by moisture and atmospheric gases. In contrast to conventional transfer molding of epoxy materials, the polymerization rate of RIM reactants can be adjusted, independently of other factors, to ensure complete polymerization within the molding cycle, thus eliminating the need for post-molding curing ovens from the encapsulating process. The molding cycle can be made deliberately short, typically less than 10 seconds. The chemical material components used in the present invention are cross linked polymeric materials formed from the polymerization in the mold of anionically initiated, vinyl aromatic chemicals.

Bending and breakage of 0.4 mil gold wires that provide electrical connection from a microchip to input and output pins in a lead frame is known as wire sweep, and is caused by hydraulic drag on the wires by the flowing encapsulating material during the encapsulating process. Wire sweep can occur when the melt viscosity is too high, typically greater than 200 poise. With conventional transfer molding technology, wire sweep can occur when the chemical material components have been improperly stored, a condition that permits some polymerization along with a commensurate increase in molecular weight and viscosity. The RIM chemical components have a viscosity of less than 20 poise at room temperature, and no polymerization can occur until the reactants are mixed at the inlet of the mold. As a result, components that are encapsulated using the RIM process herein described are characterized by having virtually no wire sweep, in contrast to conventional epoxy molding techniques.

Some components encapsulated by this process are impossible to encapsulate using conventional transfer molding techniques because of the increased temperature and pressures involved with conventional transfer molding techniques. An example of such an encapsulated device that is distinguishable from devices encapsulated using other techniques is a liquid crystal display (LCD) component. Because of its temperature sensitivity and fragile nature, it is not possible to encapsulate an LCD component using conventional techniques, whereas the present technique enables encapsulation without deterioration due to excessive temperature or breakage due to high pressures.

Conventional transfer molding uses epoxy materials that are manufactured from epichlorohydrin and other chemicals. Residual epichlorohydrin must be carefully removed from the epoxy material, at considerable cost, to prevent possible corrosion of microchips by the hydrolysis of this chemical. None of the chemical components used in the present inventive concept are produced from chlorine containing compounds, thereby eliminating a potential corrosion problem. The present RIM formulations contain t-butyl styrene and divinyl benzene, neither of which is produced from chlorine containing compounds.

A comparison of the mechanical properties of RIM encapsulated components with epoxy encapsulated components indicate comparable values. Moisture absorption of the RIM materials is lower than that of most epoxy compounds, and moisture does not soften or plasticize the RIM material, unlike epoxy. Conventional epoxies are also well known as good adhesives for metals and ceramics. Consequently, conventional transfer molding compounds usually contain release additives to prevent adhesion to metal molds. Unfortunately, this additive may also prevent adequate and necessary adhesion to the lead frame. The RIM materials do not naturally adhere to metals or ceramics, however adhesion can be obtained that rivals epoxy by treating the desired surfaces with an adhesion promoter prior to encapsulation. Room temperature RIM reactants are typically polymerized at mold temperatures near 90° C. and pressures less than 300 psi. By contrast, epoxy materials may require mold temperatures near 130° C. and pressures of 1000 psi. Lower mold temperatures result in reduced thermal stress in the encapsulating package. Both conventional epoxy encapsulants and RIM formulations incorporate about 80% silica filler to improve mechanical properties. The RIM reactants are also significantly less costly than electronics grade epoxies. The present RIM system is based on tert-butyl styrene monomer and divinyl benzene (DVB) cross-linker, butyl lithium, for initiating polymerization, and 80% by weight silica fillers.

The invention disclosed herein provides a novel RIM system for handling and dispensing improved materials to a unique mix head that has the capability of mixing silica paste with a monomer to form a monomer slurry, mixing a small quantity of initiator to start the polymerization process, and delivering the low viscosity material to a mold cavity. Because of problems associated with conventional control valves to control the flow of a silica/monomer paste, the system has been designed eliminate control valves for handling the paste. Because premixed silica/monomer slurry feed stock will always settle during storage and shipping, the present system reconstitutes a silica paste with a monomer to form a silica/monomer slurry in the mix head just prior to mixing an initiator material with the slurry and delivery of the initiated slurry to a mold. The mix head incorporates a small inline high speed rotary mixer that typically rotates at 5000 RPM. The mixer is magnetically driven to eliminate high speed rotating seals, and has several features to initiate the slurry, including chemical feed and light feed port. The design of the system also enables relatively low feed line pressures because mechanical energy for mixing is provided by an external motor rather than by feed line pressure for creating turbulent mixing. The chemical handling is facilitated by special tubular containers filled by the materials manufacturer that are mounted on the dispensing equipment, and require no special storage, handling, or mixing by trained personnel. The empty containers can be recycled to the materials manufacturer for refilling and proper disposal. A programmable controller such as a personal computer provides control for the process. In the operation of the dispensing equipment, "pinch rollers" driven by computer controlled stepping motors cause a precisely determined amount of material to be dispensed to the mix head. This invention provides a system that is capable of mold cycle times of 6 to 12 seconds in order to achieve complete polymerization, thus eliminating the need for an oven curing cycle of 2 to 4 hours. This is achieved because the materials are not premixed, but are combined in the novel mix head just prior to filling a mold cavity.

A system having features of the present invention comprises a means for delivering a monomer slurry to a polymerizing mixing means, means for delivering a polymerizing initiator to the polymerizing mixing means, means for forming a rapidly polymerizing slurry by combining the monomer slurry and the polymerizing initiator in the polymerizing mixing means, and means for delivering the rapidly polymerizing slurry to a mold. The means for delivering the monomer slurry may comprise a means for delivering a silica paste to a monomer slurry mixing means, means for delivering a monomer to the monomer slurry mixing means, means for forming the monomer slurry by combining the monomer and the silica paste in the monomer slurry mixing means, and means for delivering the monomer slurry to the polymerizing mixing means. The system may further comprise means for delivering a polymerizing quencher to the polymerizing mixing means, means for forming a quenched polymerizing slurry by combining the polymerizing quencher and the rapidly polymerizing slurry in the polymerizing mixing means, and means for delivering the quenched polymerizing slurry to a waste tank. In addition, the system may further comprise means for controlling the monomer slurry delivering means, the polymerizing initiator delivering means, the rapidly polymerizing slurry forming means, and the rapidly polymerizing slurry delivering means. The system may also comprise means for controlling the silica paste delivering means, the monomer delivering means, the monomer slurry forming means, the polymerizing initiator delivering means, the rapidly polymerizing slurry forming means, the rapidly polymerizing slurry delivering means, the polymerizing quencher delivering means, the quenched polymerizing slurry forming means, and the quenched polymerizing slurry delivering means.

In an alternate embodiment of the invention, the means for delivering the monomer slurry comprises a collapsible tubing containing the monomer slurry having a free end and an outlet end, a feed spool containing the collapsible tubing such that the outlet end is connected to a rotary union at an axis of the feed spool, a pinch roll assembly for collapsing the collapsible tubing from the feed spool when the pinch roll assembly is rotationally activated, causing the monomer slurry to be squeezed out of the collapsible tubing at the outlet end through the rotary union to the polymerizing mixing means, and a take-up spool for containing the collapsed collapsible tubing such that the free end is connected at an axis of the take-up spool. The means for delivering the monomer slurry may comprise a pressure feed tank connected to a rotationally activated metering pump. The pump is normally driven by a stepper motor, and the pressure feed tank may be a bladder, a container with a rigid diaphragm, or a container pressurized with nitrogen or argon. The means for delivering the polymerizing initiator comprises a collapsible tubing containing the polymerizing initiator having a free end and an outlet end, a feed spool containing the collapsible tubing such that the outlet end is connected to a rotary union at an axis of the feed spool, a pinch roll assembly for collapsing the collapsible tubing from the feed spool when the pinch roll assembly is rotationally activated, causing the polymerizing initiator to be squeezed out of the collapsible tubing at the outlet end through the rotary union to the polymerizing mixing means, and a take-up spool for containing the collapsed collapsible tubing such that the free end is connected at an axis of the take-up spool. The means for delivering the polymerizing initiator may comprise a pressure feed tank connected to a rotationally activated metering pump. The pump is normally driven by a stepper motor, and the pressure feed tank may be a bladder, a container with a rigid diaphragm, or a container pressurized with nitrogen or argon. The means for delivering the rapidly polymerizing slurry to the mold may comprise a valve. The means for delivering the silica paste comprises a collapsible tubing containing the silica paste having a free end and an outlet end, a feed spool containing the collapsible tubing such that the outlet end is connected to a rotary union at an axis of the feed spool, a pinch roll assembly for collapsing the collapsible tubing from the feed spool when the pinch roll assembly is rotationally activated, causing the silica paste to be squeezed out of the collapsible tubing at the outlet end through the rotary union to the monomer slurry mixing means, and a take-up spool for containing the collapsed collapsible tubing such that the free end is connected at an axis of the take-up spool. The means for delivering the silica paste may comprise a pressure feed tank connected to a rotationally activated metering pump. The pump is normally driven by a stepper motor, and the pressure feed tank may be a bladder, a container with a rigid diaphragm, or a container pressurized with nitrogen or argon. The means for delivering the monomer comprises a collapsible tubing containing the monomer having a free end and an outlet end, a feed spool containing the collapsible tubing such that the outlet end is connected to a rotary union at an axis of the feed spool, a pinch roll assembly for collapsing the collapsible tubing from the feed spool when the pinch roll assembly is rotationally activated, causing the monomer to be squeezed out of the collapsible tubing at the outlet end through the rotary union to the monomer slurry mixing means, and a take-up spool for containing the collapsed collapsible tubing such that the free end is connected at an axis of the take-up spool. The means for delivering the monomer may comprise a pressure feed tank connected to a rotationally activated metering pump. The pump is normally driven by a stepper motor, and the pressure feed tank may be a bladder, a container with a rigid diaphragm, or a container pressurized with nitrogen or argon. The means for delivering the polymerizing quencher comprises a collapsible tubing containing the polymerizing quencher having a free end and an outlet end, a feed spool containing the collapsible tubing such that the outlet end is connected to a rotary union at an axis of the feed spool, a pinch roll assembly for collapsing the collapsible tubing from the feed spool when the pinch roll assembly is rotationally activated, causing the polymerizing quencher to be squeezed out of the collapsible tubing at the outlet end through the rotary union to the polymerizing mixing means, and a take-up spool for containing the collapsed collapsible tubing such that the free end is connected at an axis of the take-up spool. The means for delivering the polymerizing quencher may comprise a pressure feed tank connected to a rotationally activated metering pump. The pump is normally driven by a stepper motor, and the pressure feed tank may be a bladder, a container with a rigid diaphragm, or a container pressurized with nitrogen or argon. The means for delivering the quenched polymerizing slurry to the waste tank may comprise a valve. The means for delivering the quenched polymerizing slurry to the waste tank or the rapidly polymerizing slurry to a mold may comprise a three-way valve.

In another embodiment of the invention, the means for forming a rapidly polymerizing slurry in the polymerizing mixing means comprises a mix head. The means for forming the monomer slurry in the monomer mixing means and the means for delivering the monomer slurry to the polymerizing mixing means comprise a mix head. The means for forming a quenched polymerizing slurry in the polymerizing mixing means comprises a mix head. Furthermore, the means for forming a monomer slurry in the monomer mixing means comprises a mix head, the means for delivering the monomer slurry to the polymerizing mixing means comprises the mix head, the means for forming a rapidly polymerizing slurry in the polymerizing mixing means comprises the mix head, and the means for forming a quenched polymerizing slurry in the polymerizing mixing means comprises the mix head. The mix head may comprise an electric motor having a drive shaft connected to an input end of a coupling, a mixing spindle connected to an output end of the coupling and positioned within a sealed mixing cavity within a mixing body by a spindle bearing, the mixing body having a cylindrical-shaped inner wall, an upper annular spacing in the mixing cavity between an upper section of the mixing spindle and an upper section of the mixing body, forming a monomer slurry mixing annulus, a lower annular spacing in the mixing cavity between a lower section of the mixing spindle and a lower section of the mixing body, forming a polymerizing slurry mixing annulus, a monomer feed port connected to the monomer delivering means and positioned in the mixing body wall at the monomer slurry mixing annulus for injecting a monomer into the monomer slurry mixing annulus, a silica paste feed port connected to the silica paste delivering means and positioned in the mixing body wall at the monomer slurry mixing annulus for injecting a silica paste into the monomer slurry mixing annulus, a polymerizing initiator feed port connected to the polymerizing initiator delivering means and positioned in the mixing body wall at the polymerizing slurry mixing annulus for injecting a polymerizing initiator into the polymerizing slurry mixing annulus, a polymerizing quencher feed port connected to the polymerizing quencher delivering means and positioned in the mixing body wall at the polymerizing slurry mixing annulus for injecting a polymerizing quencher into the polymerizing slurry mixing annulus, and an output port positioned in the bottom of the mixing body opposite the coupling below the polymerizing slurry mixing annulus for ejecting a polymerizing slurry from the mixing cavity. The mix head may further comprise a pressure sensor positioned in the mixing body wall for determining when the mold is filled with the rapidly polymerizing slurry. The mix head may further comprise a light port positioned in the mixing body wall below the polymerizing slurry mixing annulus for use of a light sensing probe for determining the polymerizing slurry characteristics.

In an alternate embodiment, the mix head further comprises a light port positioned in the mixing body wall below the polymerizing slurry mixing annulus for use of a radiation source in initiating polymerization of a photo-curable monomer slurry, the polymerizing initiator feed port is deleted from the mixing body wall, and the polymerizing initiator delivering means is eliminated. The electric motor may be a high, variable speed electric motor. The coupling may be a sealed magnetic coupling. The mixing spindle bearing may be sealed. The system may further comprise a means for heating the polymerizing slurry. The monomer feed port and the silica paste feed port may be replaced by a single monomer slurry feed port connected to the monomer slurry delivering means and positioned in the mixing body wall above the polymerizing slurry mixing annulus for injecting a premixed slurry of monomer and silica paste into the mixing cavity. The system may further comprise a three-way valve having an input connected to the output port of the mixing cavity, a first output connected to the mold, and a second output connected to the waste tank. The system may further comprise means for controlling a temperature of the rapidly polymerizing slurry in the polymerizing mixing means. The system may further comprise means for controlling a temperature of the monomer slurry interposed between the means for delivering the monomer slurry and the polymerizing mixing means, and means for controlling a temperature of the polymerizing initiator interposed between the means for delivering the polymerizing initiator and the polymerizing mixing means. The system may further comprise means for controlling a temperature of the silica paste interposed between the means for delivering the silica paste and the monomer slurry mixing means, and means for controlling a temperature of the monomer interposed between the means for delivering the monomer and the monomer slurry mixing means. The system may further comprise means for controlling a temperature of the monomer slurry at the means for delivering the monomer slurry, and means for controlling a temperature of the polymerizing initiator at the means for delivering the polymerizing initiator. The system may further comprise means for controlling a temperature of the silica paste at the means for delivering the silica paste, and means for controlling a temperature of the monomer at the means for delivering the monomer.

In another embodiment, a mixing and dispensing system for rapidly polymerizing materials comprises a mix head having a variable speed electric motor coupled to a mixing spindle positioned within a sealed mixing cavity within a mixing body having a cylindrical-shaped inner wall, the electric motor being positioned at a first end of the mixing body, a monomer feed port connected to a monomer delivering subsystem and positioned in the mixing body wall, a silica paste feed port connected to a silica paste delivering subsystem and positioned in the mixing body wall, a polymerizing initiator feed port connected to a polymerizing initiator delivering subsystem and positioned in the mixing body wall, a polymerizing quencher feed port connected to a polymerizing quencher delivering subsystem and positioned in the mixing body wall, a pressure sensor positioned in the mixing body wall for determining mix head pressure, an outlet port positioned at a second end of the mixing body opposite the electric motor, and being connected to an input of a three-way valve, a first output of the three-way valve being connected to an inlet of an injection tunnel, and a second output of the three-way valve being connected to a waste tank, a means for positioning a mold in relation to the mix head, a means for positioning the injector tunnel so that an injector tunnel outlet is in contact with an inlet of the mold, a means for ejecting a molded part from the mold, and a programmable controller connected to the monomer delivering subsystem, the silica paste delivering subsystem, the polymerizing initiator delivering subsystem, the polymerizing quencher delivering subsystem, the variable speed electric motor, the pressure sensor, the three-way valve, the mold positioning means, the injector tunnel positioning means, and the molded part ejecting means.

In the present invention, a mixing and dispensing process for rapidly polymerizing materials comprises the steps of delivering a monomer slurry to a polymerizing mixing means, delivering a polymerizing initiator to the polymerizing mixing means, forming a rapidly polymerizing slurry by combining the monomer slurry and the polymerizing initiator in the polymerizing mixing means, and delivering the rapidly polymerizing slurry to a mold. The step of delivering a monomer slurry may comprise the steps of delivering the silica paste to a monomer slurry mixing means, delivering the monomer to the monomer slurry mixing means, forming the monomer slurry by combining the monomer and the silica paste in the monomer slurry mixing means, and delivering the monomer slurry to the polymerizing mixing means. The process may further comprise the steps of delivering a polymerizing quencher to the polymerizing mixing means, forming a quenched polymerizing slurry by combining the polymerizing quencher and the rapidly polymerizing slurry in the polymerizing mixing means, and delivering the quenched polymerizing slurry to a waste tank. The process may further comprise the step of controlling a temperature of the rapidly polymerizing slurry in the polymerizing mixing means. The process may further comprise the steps of controlling a temperature of the monomer slurry during the step of delivering the monomer slurry to the polymerizing mixing means, and controlling a temperature of the polymerizing initiator during the step of delivering the polymerizing initiator to the polymerizing mixing means. The process may further comprise the steps of controlling a temperature of the silica paste during the step of delivering the silica paste to the monomer slurry mixing means, and controlling a temperature of the monomer during the step of delivering the monomer to the monomer slurry mixing means. The process may further comprise the steps of controlling a temperature of the monomer slurry prior to delivering the monomer slurry, and controlling a temperature of the polymerizing initiator prior to delivering the polymerizing initiator. The process may further comprise the steps of controlling a temperature of the silica paste prior to delivering the silica paste, and controlling a temperature of the monomer prior to delivering the monomer. The process may further comprise the step of controlling the monomer slurry delivering step, the polymerizing initiator delivering step, the rapidly polymerizing slurry forming step, and the rapidly polymerizing slurry delivering step by a programmable controller. The process may also comprise the step of controlling the silica paste delivering step, the monomer delivering step, the monomer slurry forming step, the polymerizing initiator delivering step, the rapidly polymerizing slurry forming step, the rapidly polymerizing slurry delivering step, the polymerizing quencher delivering step, the quenched polymerizing slurry forming step, and the quenched polymerizing slurry delivering step by a programmable controller.

In the mixing and dispensing process for rapidly polymerizing materials, the programmable controller may comprise a computer program comprising the steps of checking for system faults, executing a pour cycle, repositioning the mold, ejecting a molded part, and repeating the previous four steps. The step of checking for system faults may comprise the steps of determining if the delivering subsystems are ready, setting a purge/quench alarm and initiating a purge/quench cycle if the delivering subsystems are not ready, determining if a mix head pressure is zero, sending back up commands to the delivering subsystems if the mix head pressure is not zero, setting the purge/quench alarm and initiating the purge/quench cycle if more than three contiguous back up commands are sent to the delivering subsystems because of a non-zero mix head pressure, determining if an elapsed time since a last pour is less than a predetermined pour time limit T1 and setting the purge/quench alarm and initiating the purge/quench cycle if the elapsed time since the last pour is not less than the predetermined pour time limit T1, determining if a polymer is forming in a mix head, setting a polymerizing alarm and enabling an operator to override the polymerizing alarm and restart the step of checking for system faults by repeating the previous steps if the polymer is not forming in the mix head, setting the purge/quench alarm and initiating the purge/quench cycle if an operator does not override the polymerizing alarm, determining if the mold is positioned correctly, and restarting the step of checking for system faults by repeating the previous steps if the mold is not positioned correctly. The step of executing the pour cycle may comprise the steps of sending an advance tunnel command to an injection tunnel positioning means for positioning an injection tunnel outlet in contact with an inlet of the mold, determining if an injection tunnel contacts the mold, repeating the previous two steps if the injection tunnel does not contact the mold, setting an injection tunnel advance alarm if the injection tunnel does not contact the mold after three contiguous advance tunnel commands, determining if an elapsed time since a last pour is less than a predetermined pour time limit T1 and setting a purge/quench alarm and initiating a purge/quench cycle if an operator does not correct the injection tunnel alarm within the predetermined pour time limit TI, beginning pouring by starting the delivering subsystems and resetting a pour timer, determining if a mix head pressure is less than a predetermined pressure limit, determining if delivered chemical volumes are less than predetermined volume limits, repeating the previous three steps if the mix head pressure is less than the predetermined pressure limit and the delivered chemical volumes are less than the predetermined volume limits, stopping the pouring by stopping the delivering subsystems and sending back up commands to the delivering subsystems if either the mix head pressure is not less than the predetermined pressure limit or the delivered chemical volumes are not less than the predetermined volume limits, determining if delivered chemical ratios are correct, setting a ratios alarm if the delivered chemical ratios are not correct, setting the purge/quench alarm and initiating the purge/quench cycle if the operator does not reset the ratios alarm after a predetermined ratios alarm time limit, determining if the delivered chemical volumes are within predetermined volume ranges, setting a volume alarm if the delivered chemical volumes are not within the predetermined volume ranges, sending a retract tunnel command to the injection tunnel positioning means, determining if the injection tunnel contacts the mold, repeating the previous two steps if the injection tunnel continues to contact the mold, setting an injection tunnel retract alarm if the injection tunnel does not retract from the mold after three contiguous retract tunnel commands, and determining if the elapsed time since the last pour is less than the predetermined pour time limit T1 and setting the purge/quench alarm and initiating the purge/quench cycle if the operator does not correct the injection tunnel retract alarm within the predetermined pour time limit T1. The step of repositioning the mold may comprise the steps of sending a reposition mold command to a mold positioning means, determining if the mold is repositioned, repeating the previous two steps if the mold is not repositioned, setting a mold repositioning alarm if the mold does not reposition after three contiguous reposition mold commands, and determining if an elapsed time since a last pour is less than a predetermined pour time limit T1 and setting a purge/quench alarm and initiating a purge/quench cycle if an operator does not correct the mold repositioning alarm within the predetermined pour time limit T1. The step of ejecting the molded part may comprise the steps of sending an eject molded part command to a molded part ejecting means, determining if a molded part is ejected, repeating the previous two steps if the molded part is not ejected, setting an eject part alarm if the molded part does not eject after three contiguous eject molded part commands, and determining if an elapsed time since a last pour is less than a predetermined pour time limit T1 and setting a purge/quench alarm and initiating a purge/quench cycle if an operator does not correct the eject part alarm within the predetermined pour time limit T1.

In the present invention, a further embodiment is an encapsulated device, comprising a device positioned within a mold and enclosed within an encapsulating material, the encapsulating material prepared by a process comprising the steps of delivering a monomer slurry to a polymerizing mixing means, delivering a polymerizing initiator to the polymerizing mixing means, forming a rapidly polymerizing slurry by combining the monomer slurry and the polymerizing initiator in the polymerizing mixing means, and delivering the rapidly polymerizing slurry to a mold. A further embodiment may be encapsulated device, comprising a device positioned within a mold and enclosed within an encapsulating material, the encapsulating material prepared by a process described above, wherein the step of delivering a monomer slurry comprises the steps of delivering the silica paste to a monomer slurry mixing means, delivering the monomer to the monomer slurry mixing means, forming the monomer slurry by combining the monomer and the silica paste in the monomer slurry mixing means, and delivering the monomer slurry to the polymerizing mixing means. In another embodiment, an encapsulated device, comprising a device positioned within a mold and enclosed within an encapsulating material, the encapsulating material prepared by a process described above, may further comprise the steps of delivering a polymerizing quencher to the polymerizing mixing means, forming a quenched polymerizing slurry by combining the polymerizing quencher and the rapidly polymerizing slurry in the polymerizing mixing means, and delivering the quenched polymerizing slurry to a waste tank. Another embodiment may be an encapsulated device, comprising a device positioned within a mold and enclosed within an encapsulating material, the encapsulating material prepared by a process described above, further comprising the step of controlling the monomer slurry delivering step, the polymerizing initiator delivering step, the rapidly polymerizing slurry forming step, and the rapidly polymerizing slurry delivering step by a computer program residing in a programmable controller. Another embodiment may be an encapsulated device, comprising a device positioned within a mold and enclosed within an encapsulating material, the encapsulating material prepared by a process described above, further comprising the steps of controlling the silica paste delivering step, the monomer delivering step, the monomer slurry forming step, the polymerizing initiator delivering step, the rapidly polymerizing slurry forming step, the rapidly polymerizing slurry delivering step, the polymerizing quencher delivering step, the quenched polymerizing slurry forming step, and the quenched polymerizing slurry delivering step by a computer program residing in a programmable controller. An encapsulated device, comprising a device positioned within a mold and enclosed within an encapsulating material, the encapsulating material prepared by a process described above, wherein the computer program residing in the programmable controller may comprise the steps of checking for system faults, executing a pour cycle, repositioning the mold, ejecting a molded part, and repeating the previous steps.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
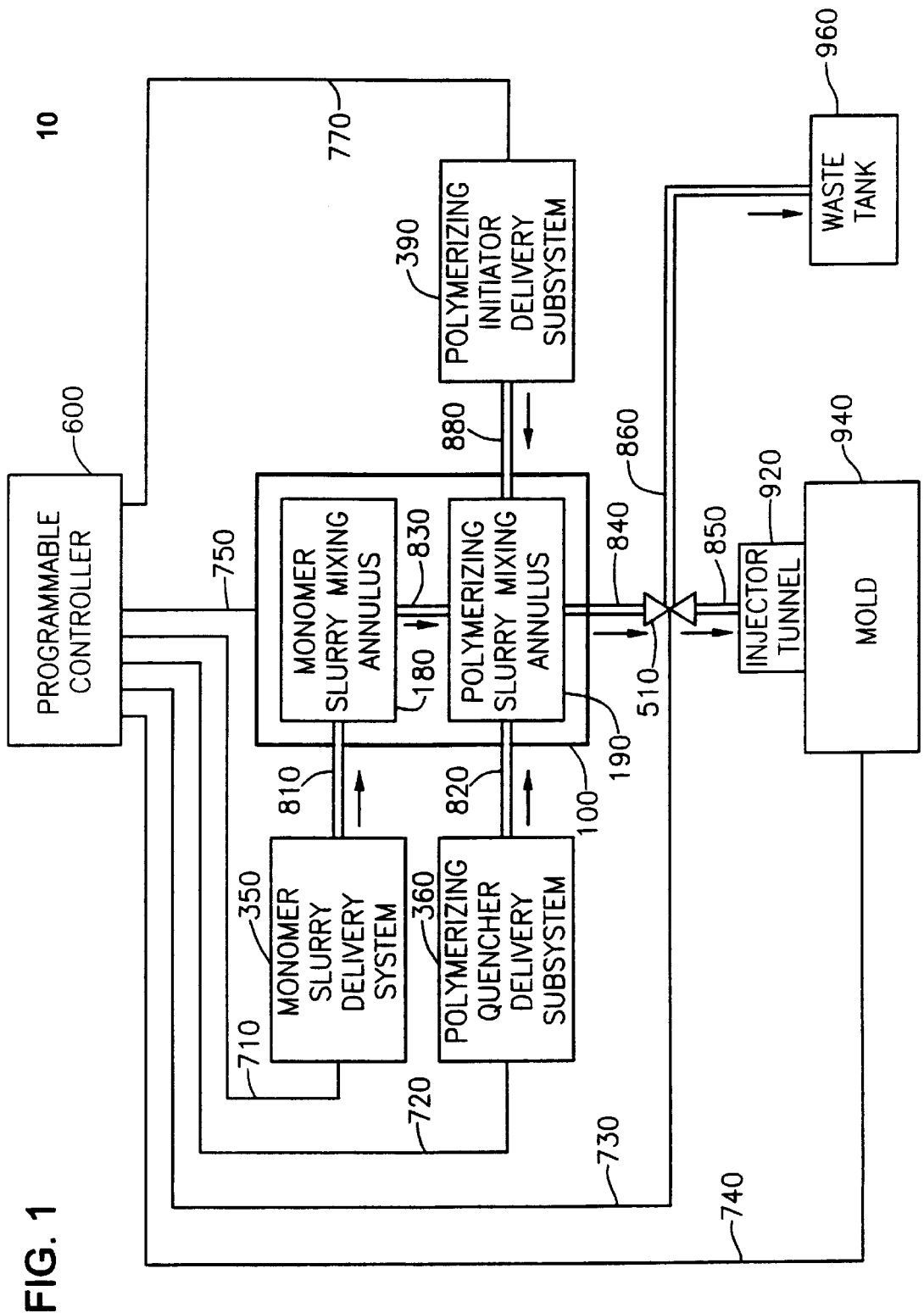
FIG. 1 shows a system diagram of a three chemical feed mixing and dispensing system.

Turning now to FIG. 1, a preferred embodiment of the system 10, is shown in accordance with the present inventive concepts. FIG. 1 shows a system diagram of a three chemical feed mixing and dispensing system 10. The mixing and dispensing system 10 comprises three chemical delivery subsystems including a monomer slurry delivery subsystem 350, a polymerizing quencher delivery subsystem 360, and a polymerizing initiator delivery subsystem 390. In response to monomer slurry control signals 710 from a programmable controller 600, the monomer slurry delivery subsystem 350 delivers a precise quantity of monomer slurry 810 to a monomer slurry mixing annulus 180 of a mix head 100. Within the mix head 100, the monomer slurry 830 is transported from the monomer mixing annulus 180 to a polymerizing slurry mixing annulus 190. In response to polymerizing initiator control signals 770 from the programmable controller 600, the polymerizing initiator delivery subsystem 390 delivers a precise quantity of polymerizing initiator 880 to the polymerizing slurry mixing annulus 190 of the mix head 100. The monomer slurry 830 within the mix head 100 and the polymerizing initiator 880 are mixed within the polymerizing slurry mixing annulus 190 of the mix head 100, creating a rapidly polymerizing material that is delivered from the mix head 100 to an inlet of a three-way valve 510 by a mix head outlet 840. Under normal operation, in response to a valve control signal 730 from the programmable controller 600, the three-way valve 510 causes the rapidly polymerizing materials from the mix head outlet 840 to be sent to an injector tunnel 920 via an injector tunnel inlet 850. The injector tunnel 920 delivers the rapidly polymerizing material to a mold 940. The positions of the injector tunnel 920 and the mold 940 are determined by mold and injector control signals 740 from the programmable controller 600. The programmable controller 600 also controls the speed of an electric motor in the mix head 100 as well as reads and controls a pressure sensor and a light port in the mix head 100 by way of mix head control signals 750.

The polymerization rate may be controlled by suitably heating and cooling the chemical materials. This may be achieved by controlling the temperature of the reactant streams, either separately or together, over a temperature range of between 0° C. and 60° C. Control of the temperature of the reactant streams may be achieved by providing a temperature controlling jacket attached to the mix head 100 for exchanging heat with the mix head 100. Alternately, the temperature of the monomer slurry 810, the polymerizing quencher 820, and the polymerizing initiator 880 may be controlled by suitable heat exchangers placed between the delivery subsystems 350, 360, 390, and the mix head 100. Alternately, the temperature of the chemical materials in the monomer slurry delivery subsystem 350, the polymerizing quencher delivery subsystem 360, and the polymerizing initiator delivery subsystem 390 may be suitably temperature controlled by, for example, enclosing the delivery subsystems in a temperature controlled environment.

To stop the normal operation of the mixing and dispensing system, the delivery of the polymerizing initiator 880 is stopped by the polymerizing initiator delivery subsystem 390 in response to polymerizing initiator control signals 770 from the programmable controller 600. In order to expel the polymerizing material from the mix head 100, in response to polymerizing quencher control signals 720 from the programmable controller 600, the polymerizing quencher delivery subsystem 360 delivers a precise quantity of polymerizing quencher 820 to the polymerizing slurry mixing annulus 190 of the mix head 100, creating a quenched polymerizing slurry that is delivered to the inlet of the three-way valve 510 via the mix head outlet 840. In response to valve control signals 730 from the programmable controller 600, the three-way valve 510 causes the quenched polymerizing slurry to be sent to a waste tank 960 via a waste tank inlet 860.

Figure 2:
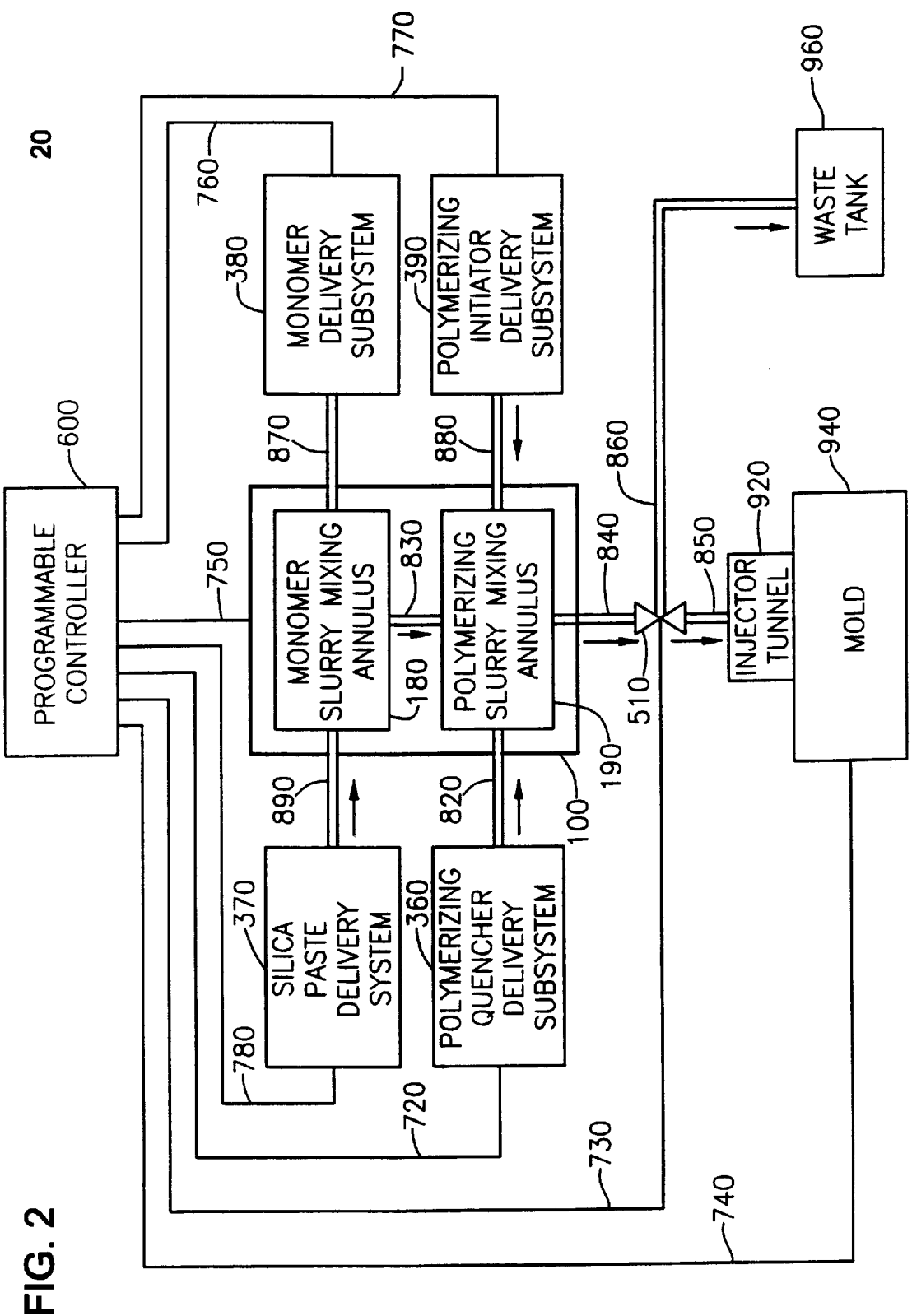
FIG. 2 shows a system diagram of a four chemical feed mixing and dispensing system.

Turning now to FIG. 2, a preferred embodiment of the system 20, is shown in accordance with the present inventive concepts. FIG. 2 shows a system diagram of a four chemical feed mixing and dispensing system 20. The mixing and dispensing system 20 comprises four chemical delivery subsystems including a silica paste delivery subsystem 370, a polymerizing quencher delivery subsystem 360, a monomer delivery subsystem 380, and a polymerizing initiator delivery subsystem 390. In response to silica paste control signals 780 from a programmable controller 600, the silica paste delivery subsystem 370 delivers a precise quantity of silica paste 890 to a monomer slurry mixing annulus 180 of a mix head 100. In response to monomer control signals 760 from the programmable controller 600, the monomer delivery subsystem 380 delivers a precise quantity of monomer 870 to the monomer slurry mixing annulus 180 of the mix head 100. The silica paste 890 and the monomer 870 are mixed within the monomer slurry mixing annulus 180 of the mix head 100, creating a monomer slurry 830 within the mix head 100. Within the mix head 100, the monomer slurry 830 is transported from the monomer mixing annulus 180 to a polymerizing slurry mixing annulus 190. In response to polymerizing initiator control signals 770 from the programmable controller 600, the polymerizing initiator delivery subsystem 390 delivers a precise quantity of polymerizing initiator 880 to the polymerizing slurry mixing annulus 190 of the mix head 100. The monomer slurry 830 within the mix head 100 and the polymerizing initiator 880 are mixed within the polymerizing slurry mixing annulus 190 of the mix head 100, creating a rapidly polymerizing material that is delivered from the mix head 100 to an inlet of a three-way valve 510 by a mix head outlet 840. Under normal operation, in response to a valve control signal 730 from the programmable controller 600, the three-way valve 510 causes the rapidly polymerizing materials from the mix head outlet 840 to be sent to an injector tunnel 920 via an injector tunnel inlet 850. The injector tunnel 920 delivers the rapidly polymerizing material to a mold 940. The positions of the injector tunnel 920 and the mold 940 are determined by mold and injector control signals 740 from the programmable controller 600. The programmable controller 600 also controls the speed of an electric motor in the mix head 100 as well as reads and controls a pressure sensor and a light port in the mix head 100 by way of mix head control signals 750.

The polymerization rate may be controlled by suitably heating and cooling the chemical materials. This may be achieved by controlling the temperature of the reactant streams, either separately or together, over a temperature range of between 0° C. and 60° C. Control of the temperature of the reactant streams may be achieved by providing a temperature controlling jacket attached to the mix head 100 for exchanging heat with the mix head 100. Alternately, the temperature of the monomer 870, the polymerizing quencher 820, the silica paste 890, and the polymerizing initiator 880 may be controlled by suitable heat exchangers placed between the delivery subsystems 360, 370, 380, 390, and the mix head 100. Alternately, the temperature of the chemical materials in the silica paste delivery subsystem 370, the monomer delivery subsystem 380, the polymerizing quencher delivery subsystem 360, and the polymerizing initiator delivery subsystem 390 may be suitably temperature controlled by, for example, enclosing the delivery subsystems in a temperature controlled environment.

To stop the normal operation of the mixing and dispensing system, the delivery of the polymerizing initiator 880 is stopped by the polymerizing initiator delivery subsystem 390 in response to polymerizing initiator control signals 770 from the programmable controller 600. To expel the polymerizing material from the mix head 100, in response to polymerizing quencher control signals 720 from the programmable controller 600, the polymerizing quencher delivery subsystem 360 delivers a precise quantity of polymerizing quencher 820 to the polymerizing slurry mixing annulus 190 of the mix head 100, creating a quenched polymerizing slurry that is delivered to the inlet of the three-way valve 510 via the mix head outlet 840. In response to valve control signals 730 from the programmable controller 600, the three-way valve 510 causes the quenched polymerizing slurry to be sent to a waste tank 960 via a waste tank inlet 860.

Figure 3:
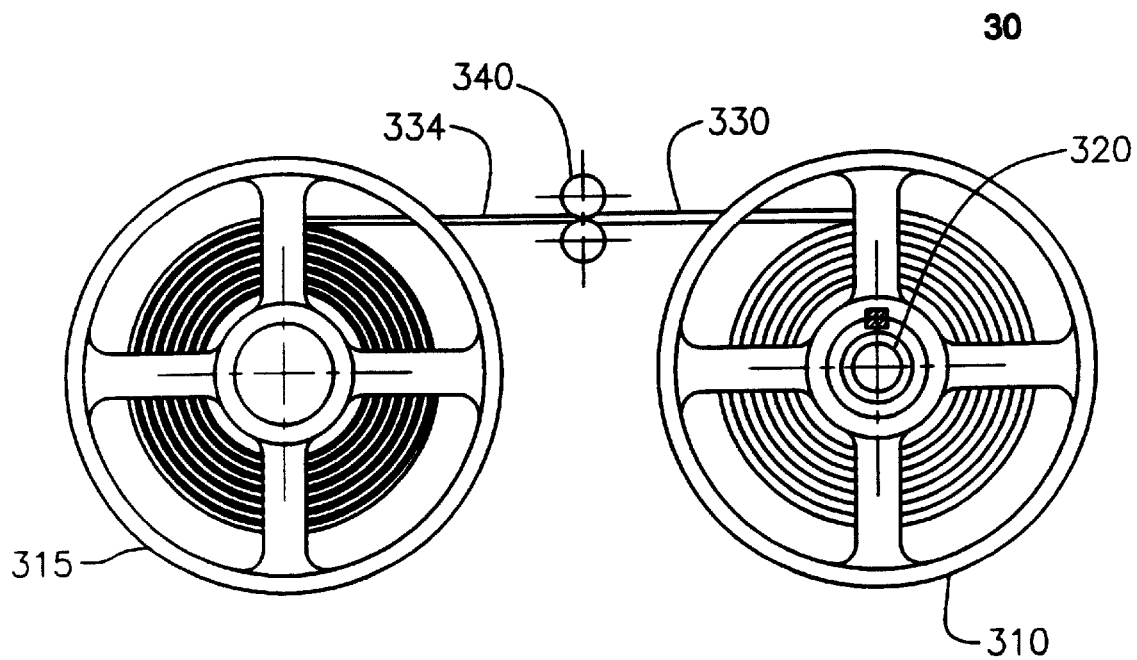
FIG. 3 shows the elements of a chemical delivery subsystem.

Turning now to FIG. 3, an alternate embodiment of the system is shown in accordance with the present inventive concepts. FIG. 3 shows the elements of a chemical delivery subsystem 30. The elements of this chemical delivery subsystem may be used in all delivery subsystems, including the monomer slurry delivery subsystem, the silica paste delivery subsystem, the monomer delivery subsystem, the polymerizing quencher delivery subsystem, and the polymerizing initiator delivery subsystem. The elements of the delivery subsystem 30 comprise a collapsible tubing 330 containing a specified chemical material, a feed spool 310 containing the collapsible tubing 330, a rotary union 320 positioned at a hub of the feed spool 310, a pinch roller assembly 340 for collapsing the collapsible tubing 330, a collapsed collapsible tubing 334, and a take-up spool 315 for containing the collapsed collapsible tubing 334. The chemical feed materials are separately packaged in the collapsible tubing 330 by the materials manufacturer, and the filled collapsible tubing 330 is supplied to the customer wound on the feed spool 310. The rotary union 320 at the hub of the feed spool 310 allows the chemical material in the collapsible tubing 330 to be delivered to the mix head. The user mounts each feed spool 310 to its rotary union 320, thereby breaking a seal to permit the chemical material to flow. The free end of the collapsible tubing 330 is placed through the pinch roll assembly 340 and connected to the take-up spool 315 which is held under constant tension. When the pinch roll assembly is rotated, the chemical material is squeezed out of the collapsible tubing 330, through piping to the mix head. As the material is squeezed out of the collapsible tubing 330, the collapsed collapsible tubing 334 is wound onto the take-up spool 315. The pinch roll assembly may be driven by stepper motors controlled by a programmable controller.

Figure 4:
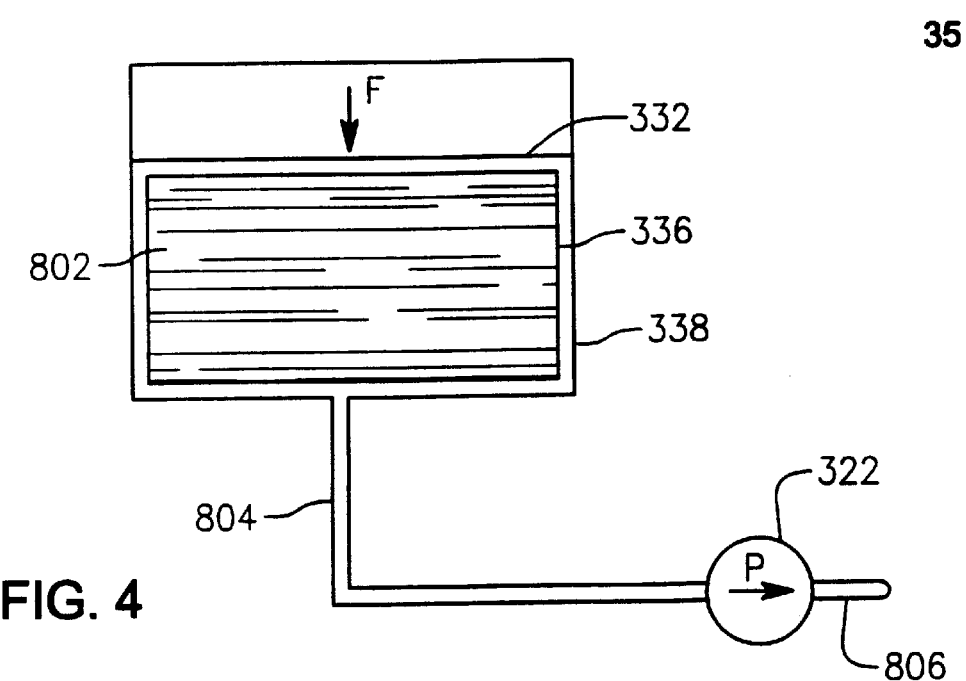
FIG. 4 shows the elements of an alternative embodiment of a chemical delivery subsystem.

Turning now to FIG. 4, FIG. 4 shows the elements of an alternative embodiment of a chemical delivery subsystem 35. This embodiment can provide a larger volume of chemical material to an encapsulating process, which may be required, for example, where either longer production runs are desired or larger volumes of chemical material are required for larger mold volumes. A chemical material 802 is contained within a pressurized feed container 338 and is fed to a stepper motor driven metering or peristaltic pump 322 via chemical material conduit 804. The metering or peristaltic pump 322 performs a metering function by controlling the amount of chemical material 802 that is provided to a mix head via chemical handling conduit 806. The chemical material 802 may be contained within a flexible container 336, such as a bladder, to provide a suitable barrier to the external environment. Pressure is maintained on the chemical material by providing a force F on a diaphragm element 332 positioned within the pressurized container 338. The force F on the diaphragm 332 may be provided by mechanical means, pneumatic means, or by pressurized nitrogen or argon gas.

Figure 5:
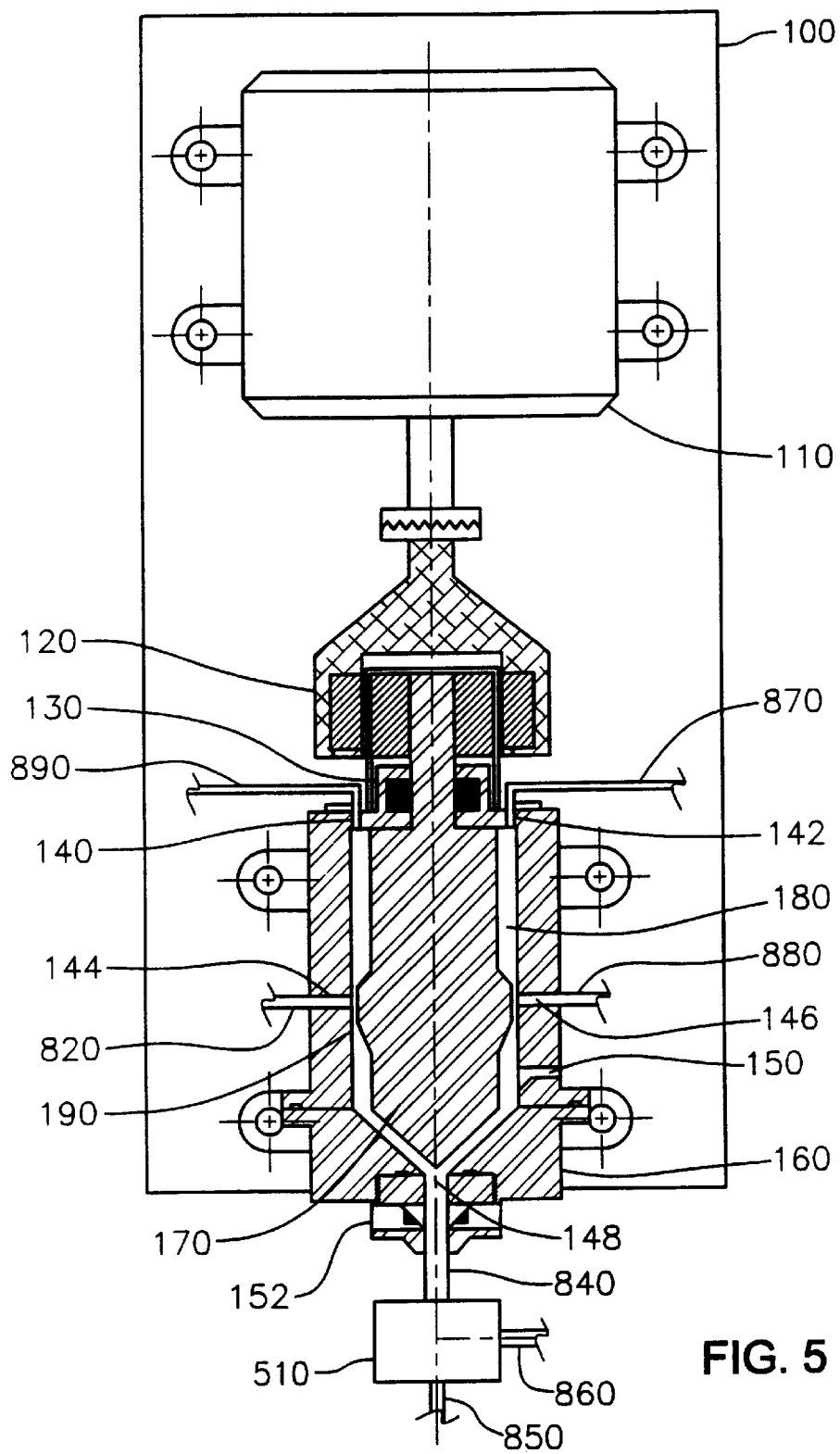
FIG. 5 shows the elements of a mix head assembly.

Turning now to FIG. 5, an embodiment of the system 40 is shown in accordance with the present inventive concepts. FIG. 5 shows the elements of a mix head assembly 100. The mix head 100 comprises a high, variable speed electric motor 110 that is coupled to a mixing spindle 170 by a sealed magnetic coupling 120 to ensure that contamination of the materials by atmospheric gases is prevented. Contamination of the sealed spindle bearings 130 by silica paste and monomer feed materials can be prevented by filling the head space, under vacuum, with mercury. Since mercury is highly incompressible, it will prevent intrusion of feed materials into the bearing region, preventing rapid bearing wear by a silica slurry feed material. Typical rotational speed of the electric motor 110 and the mixing spindle 170 is 5000 RPM. The mixing spindle 170 is positioned within a sealed cavity within a mixing body 160 having a cylindrical-shaped inner wall, the space between the inner wall and the mixing spindle forming a annular spacing. An upper section of the annular spacing closest to the magnetic coupling 120 forms a monomer slurry mixing annulus 180 for mixing silica paste and monomer feed materials. Silica paste is introduced into the monomer slurry mixing annulus 180 through a silica paste feed port 140 connected to a means for delivering the silica paste 890. Monomer is introduced into the monomer slurry mixing annulus 180 through a monomer feed port 142 connected to means for delivering the monomer 870. If a premixed monomer slurry is used in the process, one of these feed ports is plugged and the other is used to introduce a premixed monomer slurry into the monomer slurry mixing annulus. The flow of the chemical through this and subsequent sections is at right angles to the velocity gradients that are formed by the rotating mixing spindle 170, helping to ensure efficient mixing of the chemicals. The monomer slurry flows down to a lower section of the annular spacing opposite the magnetic coupling 120 that forms a polymerizing slurry mixing annulus 190. The annular clearance in this lower section is decreased in order to increase the local slurry velocity for rapidly mixing and diluting the chemicals introduced into the polymerizing slurry mixing annulus 190 and to prevent plugging of feed ports. Polymerizing initiator is introduced into the polymerizing slurry mixing annulus 190 through a polymerizing initiator feed port 146 connected to a means for delivering the polymerizing initiator 880. Polymerizing quencher is introduced into the polymerizing slurry mixing annulus 190 through a polymerizing quencher feed port 144 opposite the polymerizing initiator feed port 146, and connected to a means for delivering the polymerizing quencher 820. The polymerizing initiator initiates polymerization of the monomer slurry while the polymerizing quencher provides a reaction poison to stop the polymerizing reaction. With a polymerization reaction with an induction time of between one and five seconds, it is possible to sequentially fill multiple molds. Below the mixing spindle 170 is a mix mixing annulus outlet port 148 for supplying the rapidly polymerizing materials to the mix head outlet 840 connected to a three-way valve 510. The three-way valve 510 provides the mixed slurry to either the injector tunnel inlet 850 or the waste tank inlet 860, under control of a programmable controller. A pressure sensor 150 is installed in the wall of the mixing body 160 to signal the programmable controller that the mold cavity is filled. A light port 152 is also provided at the mixing annulus outlet port 148 through which radiation can be transmitted to a flowing slurry. This may be used to either gauge the presence of certain chemical compounds for control purposes, or when the system is used with photo-curable chemical materials, the light port serves to initiate polymerization of the material.

Figure 6:
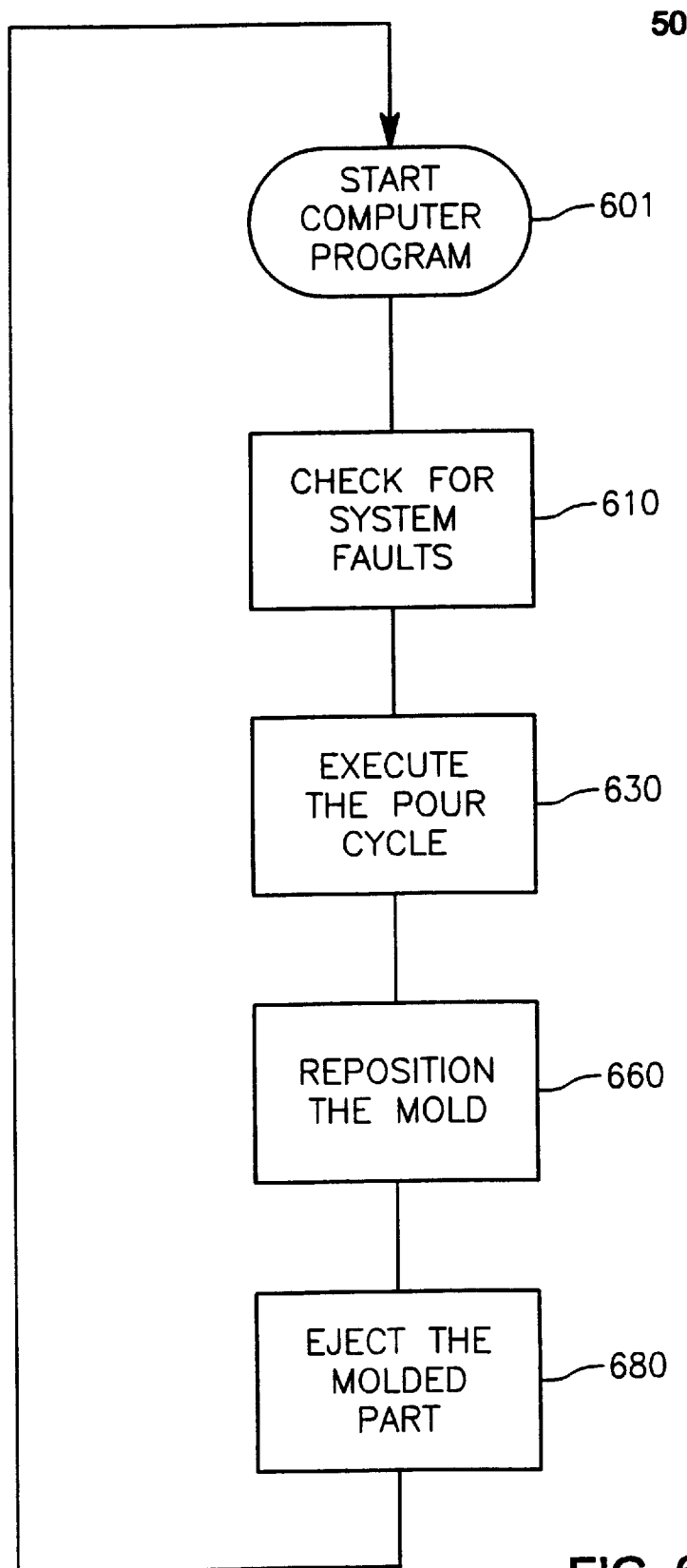
FIG. 6 shows the overall control sequence of the mixing and dispensing system operation.

Turning now to FIG. 6, FIG. 6 shows the overall control sequence 50 of the mixing and dispensing system operation. The control sequence 50 resides in memory in a programmable controller and comprises four major steps. After starting the computer program 601, the first step is to check for system faults 610. If this step is satisfied, the step to execute the pour cycle 630 is carried out, followed by a reposition of the mold 660 and an eject the molded part 680. If all of the steps are carried out without error, the control sequence is again started 601.

Figure 7:
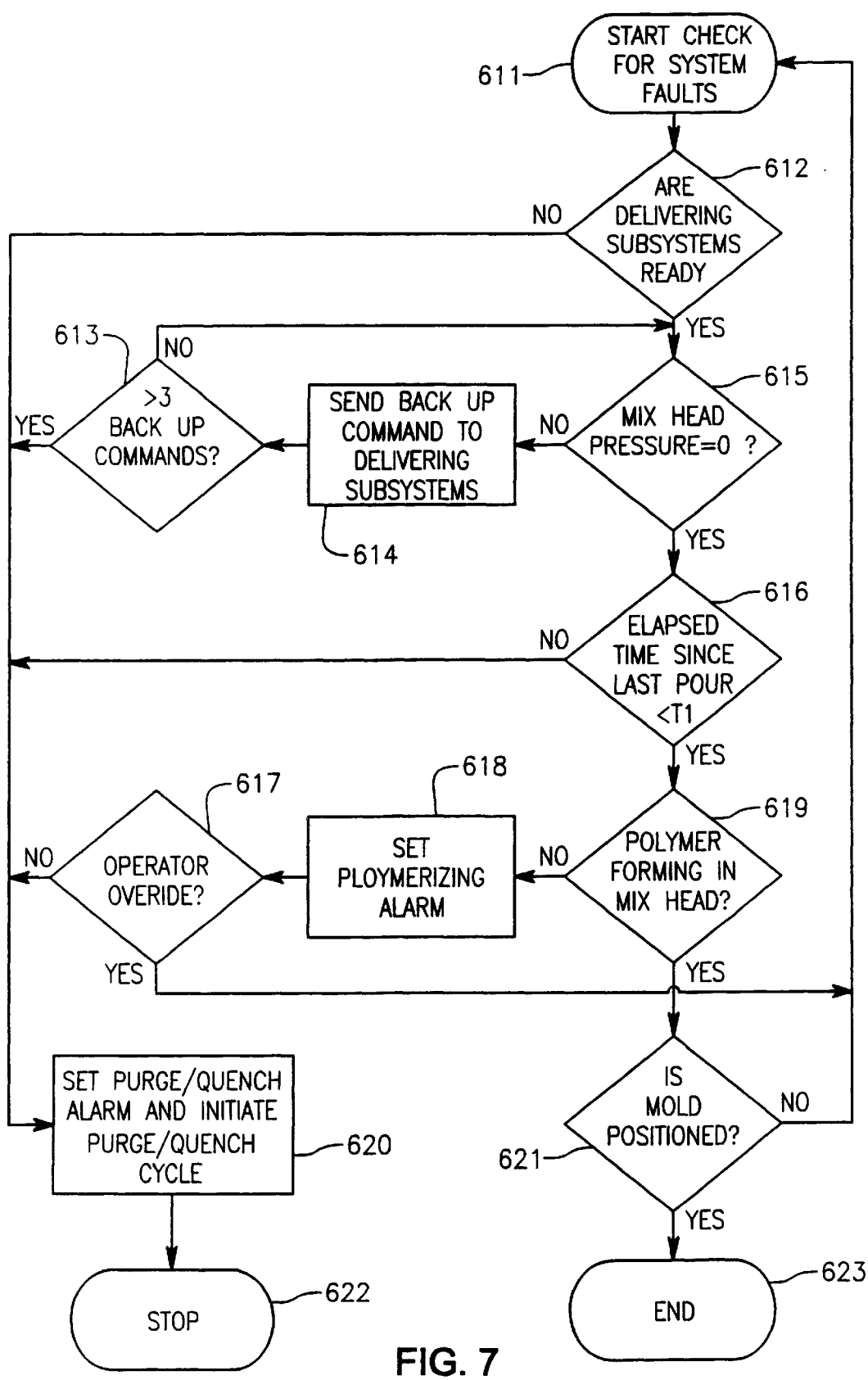
FIG. 7 shows the control sequence for checking for system faults.

Turning now to FIG. 7, FIG. 7 shows the control sequence for checking for system faults 60 (610 in FIG. 6). After starting the check for system faults 611, the delivering subsystems are checked to determine if they are ready and capable of delivering another shot 612. If they are not, a purge/quench alarm is set and a purge/quench cycle is initiated 620, after which the system is stopped 622. If the delivering subsystems are ready 612, the mix head pressure is checked to determine if it is near zero 615. If the mix head pressure is not near zero, a back up command is sent to the delivering subsystems 614 in order to reverse the stepper motors to stop material flow. If the pressure is not reduced to near zero after three back up commands 613, a purge/quench alarm is set and a purge/quench cycle is initiated 620, after which the system is stopped 622. If the mix head pressure is near zero 615, the elapsed time since the last pour is checked to determine if it is less than a preset pour time limit T1 616. If it is not less than the pour time limit T1, a purge/quench alarm is set and a purge/quench cycle is initiated 620, after which the system is stopped 622. If the elapsed time since the last pour is less than the pour time limit T1 616, it is determined if a polymer is forming in the mix head 619. If a polymer is not forming in the mix head 619, a polymerizing alarm is set 618. If the operator overrides the polymerizing alarm 617, the step of checking for system faults is restarted 611. If the operator does not override the polymerizing alarm 617, a purge/quench alarm is set and a purge/quench cycle is initiated 620, after which the system is stopped 622. If a polymer is forming in the mix head, the mold position is checked 621. If the mold position is not correct, the step of checking for system faults is restarted 611. If the mold is positioned correctly 621, the step of checking for system faults is ended 623, and the computer program continues to the step of executing the pour cycle, 630 in FIG. 6.

Figure 8A:
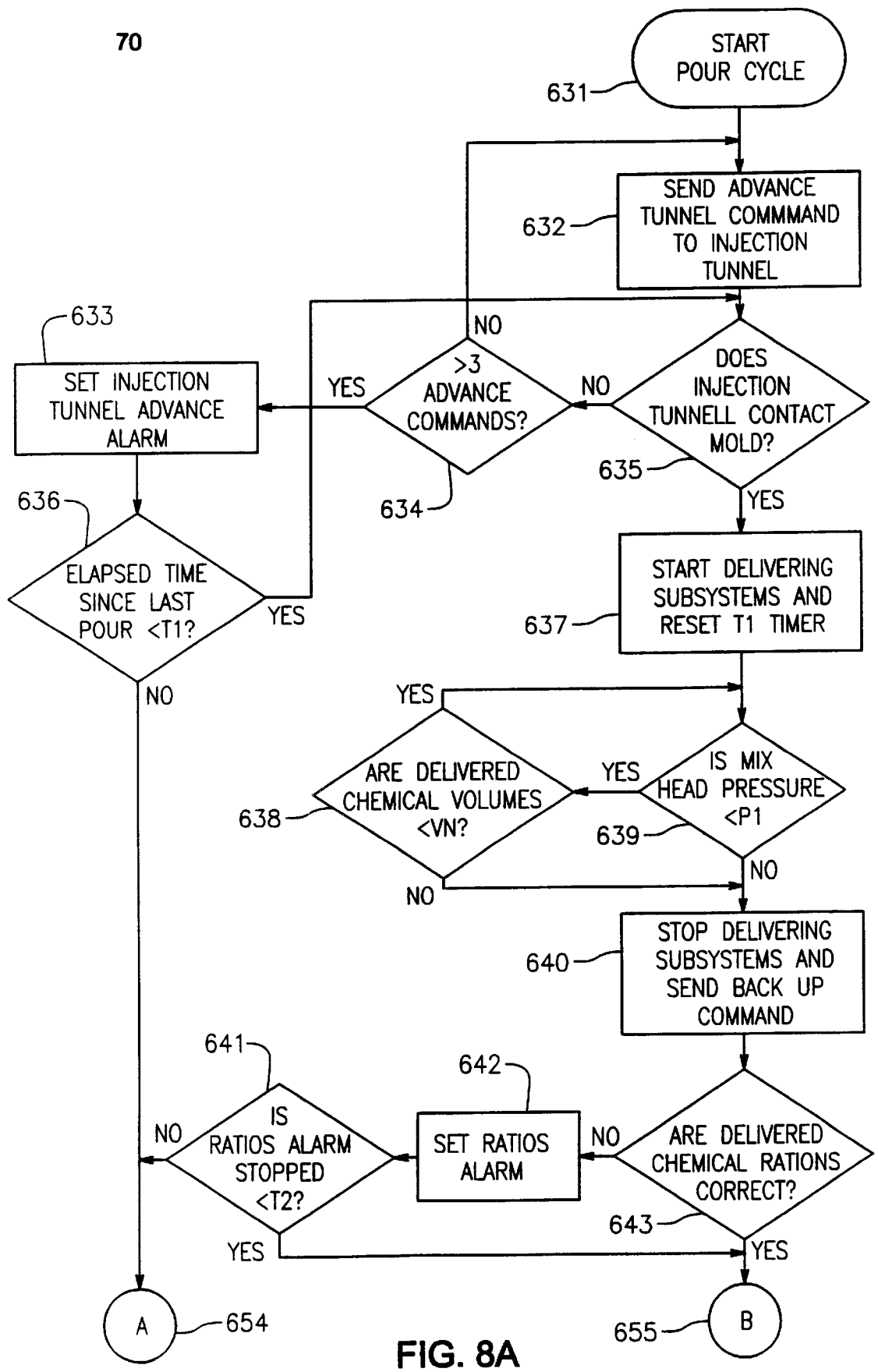
FIG. 8A and FIG. 8B show the control sequence for executing the pour cycle.
Figure 8B:
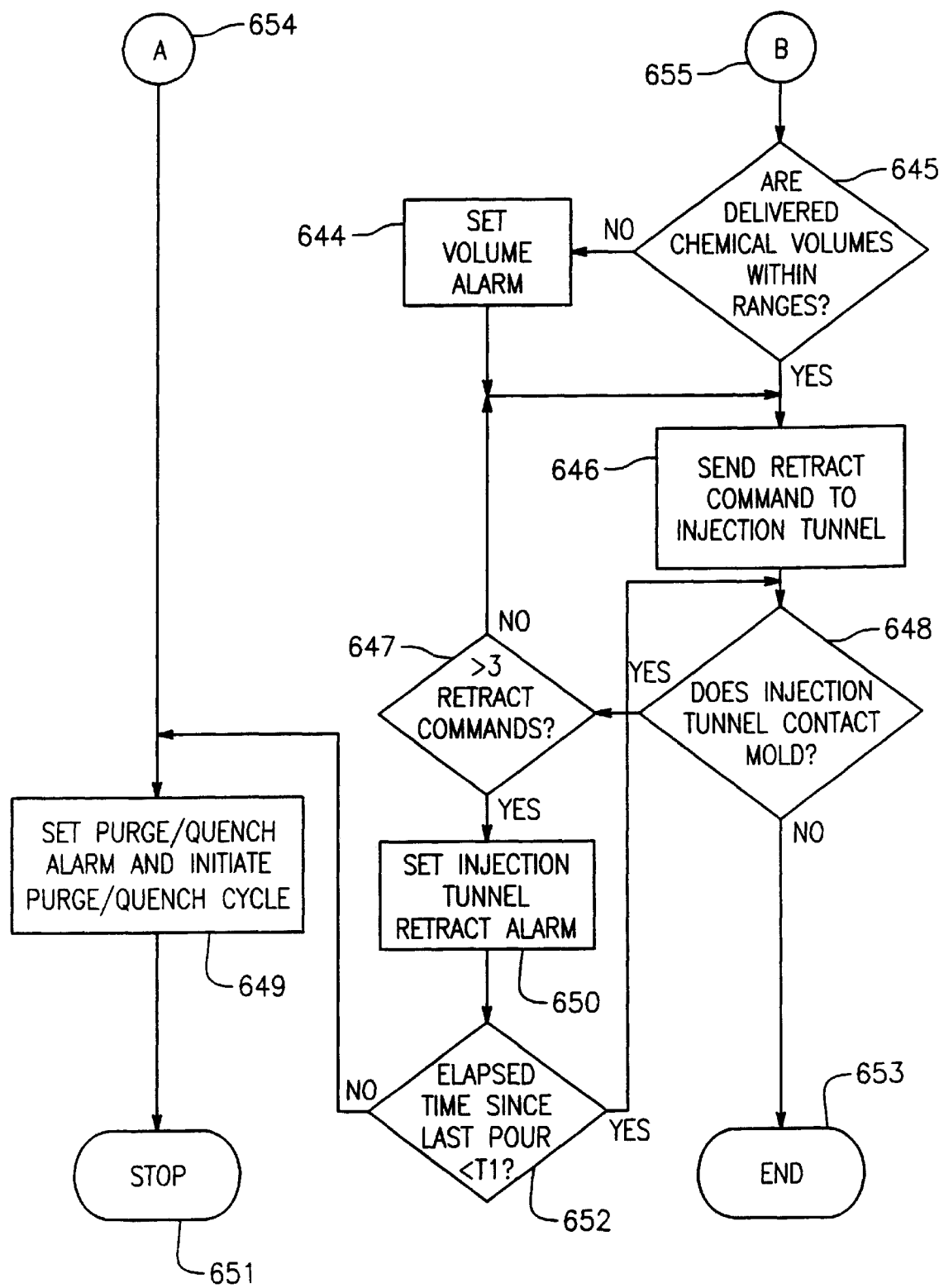

Turning now to FIG. 8A and FIG. 8B, FIG. 8A and FIG. 8B show the control sequence for executing the pour cycle 70, (630 in FIG. 6). FIG. 8B is a continuation of FIG. 8A, and they connect together at A 654 and B 655. After starting the pour cycle 631, an advance command is sent to an injection tunnel 632 to advance the injection tunnel in order to make contact between the injection tunnel and the mold. A check is made to determine if the injection tunnel contacts the mold 635. If contact has not been made, the advance tunnel command 632 is repeated for up to three times 634. If the injection tunnel does not contact the mold 635 after three contiguous advance tunnel commands 634, an injection tunnel advance alarm is set 633 and the elapsed time since the last pour is checked to determine if it is less than a preset pour time limit T1 636. If it is not less than the pour time limit T1, a purge/quench alarm is set and a purge/quench cycle is initiated 649, after which the system is stopped 651. If the elapsed time since the last pour is less than the pour time limit T1 636, a check is again made to determine if the injection tunnel contacts the mold 635. If the injection tunnel does make contact with the mold 635, the delivering subsystems are started and the pour time limit T1 timer is reset 637. A check is made to determine if the mix head pressure is less than a preset pressure value P1 639. If the check is affirmative, another check is made to determine if the delivered chemical volumes are less than preset volume limits $V_N$ 638. If the delivered volumes are less than the preset volume limits 638, the check of the mix head pressure 639 is repeated. If either the mix head pressure is not less than the preset pressure value P1 639, or the delivered chemical volumes are not less than preset volume limits $V_N$ 638, the delivering subsystems are stopped and back up commands are sent to the delivering subsystems 640. A check is made to determine if the chemical ratios are correct 643. If the ratios are not correct 643, a ratios alarm is set 642 and a determination is made if the ratios alarm is stopped within a preset ratios time limit T2 641, indicating an override by the operator. If the ratios alarm is not stopped within the preset ratios time limit T2 641, a purge/quench alarm is set and a purge/quench cycle is initiated 649, after which the system is stopped 651. If either the delivered chemical ratios are correct 643, or the ratios alarm is stopped within the ratios time limit T2 641, a check is made to determine if the delivered chemical volumes are within preset ranges 645. If the delivered chemical volumes are not within preset ranges 645, a volume alarm is set 644. After the volume alarm is set 644, or if the delivered chemical volumes are within preset ranges 645, a retract command is sent to the injection tunnel 646. A check is made to determine if the injection tunnel contacts the mold 648. If contact has not been broken, the retract tunnel command 646 is repeated for up to three times 647. If the injection tunnel contacts the mold 648 after three contiguous advance tunnel commands 647, an injection tunnel retract alarm is set 650 and the elapsed time since the last pour is checked to determine if it is less than a preset pour time limit T1 652. If it is not less than the pour time limit T1, a purge/quench alarm is set and a purge/quench cycle is initiated 649, after which the system is stopped 651. If the elapsed time since the last pour is less than the pour time limit T1 652, a check is again made to determine if the injection tunnel contacts the mold 648. If the injection tunnel no longer makes contact with the mold 648, the pour cycle is ended 653, and the computer program continues to the step of repositioning the mold, 660 in FIG. 6.

Figure 9:
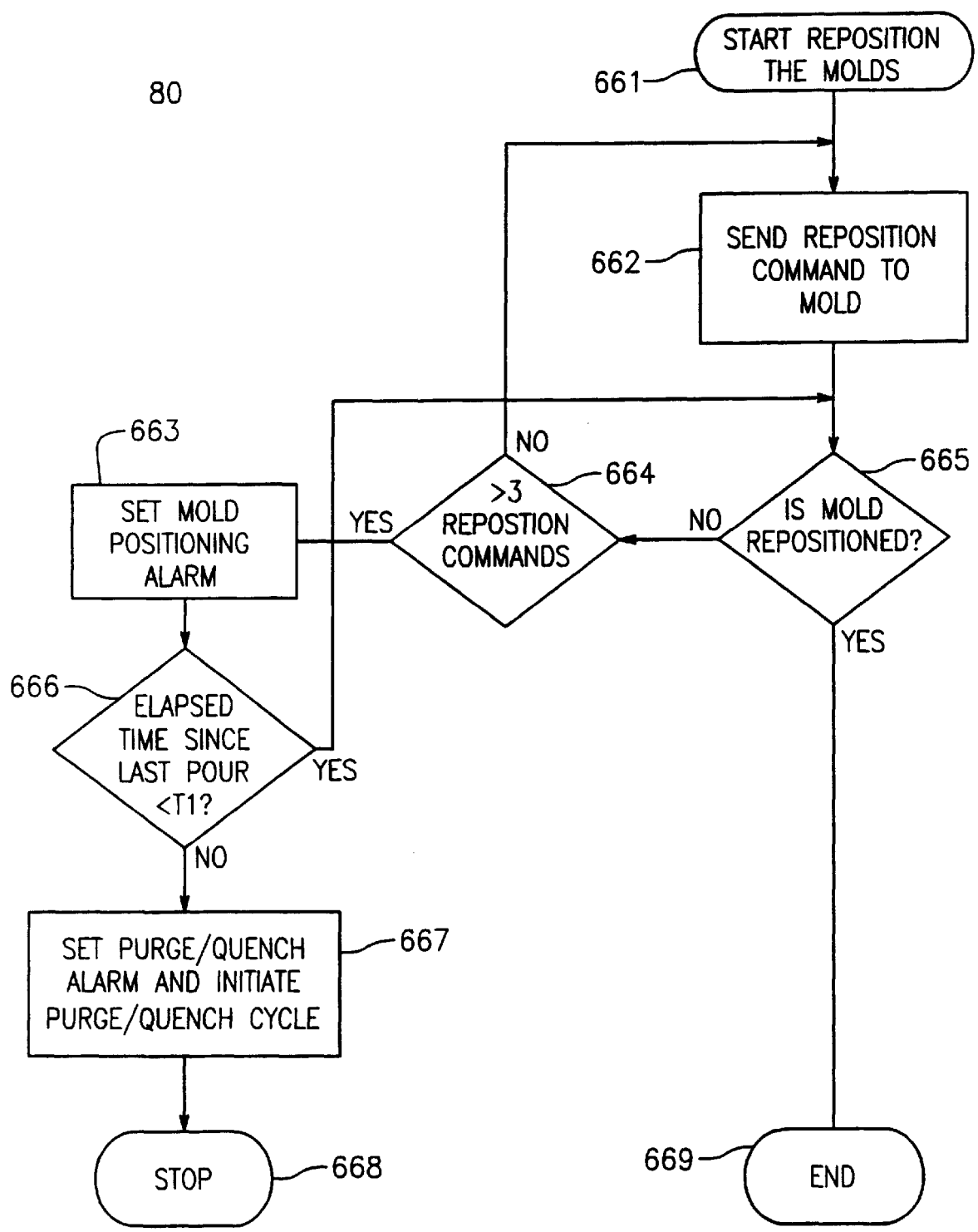
FIG. 9 shows the control sequence for repositioning the mold.

Turning now to FIG. 9, FIG. 9 shows the control sequence for repositioning the mold 80, (660 in FIG. 6). When the step of repositioning the mold is started 661, a reposition command is sent to the mold 662. A check is made to determine if the mold is repositioned 665. If the mold is not repositioned, the reposition mold command 662 is repeated for up to three times 664. If the mold is not repositioned 665 after three contiguous reposition commands 664, a mold positioning alarm is set 663 and the elapsed time since the last pour is checked to determine if it is less than a preset pour time limit T1 666. If it is not less than the pour time limit T1, a purge/quench alarm is set and a purge/quench cycle is initiated 667, after which the system is stopped 668. If the elapsed time since the last pour is less than the pour time limit T1 666, a check is again made to determine if the mold is repositioned 665. If the mold is repositioned 665, the step of repositioning the mold is ended 669, and the computer program continues to the step of ejecting the molded part, 680 in FIG. 6.

Figure 10:
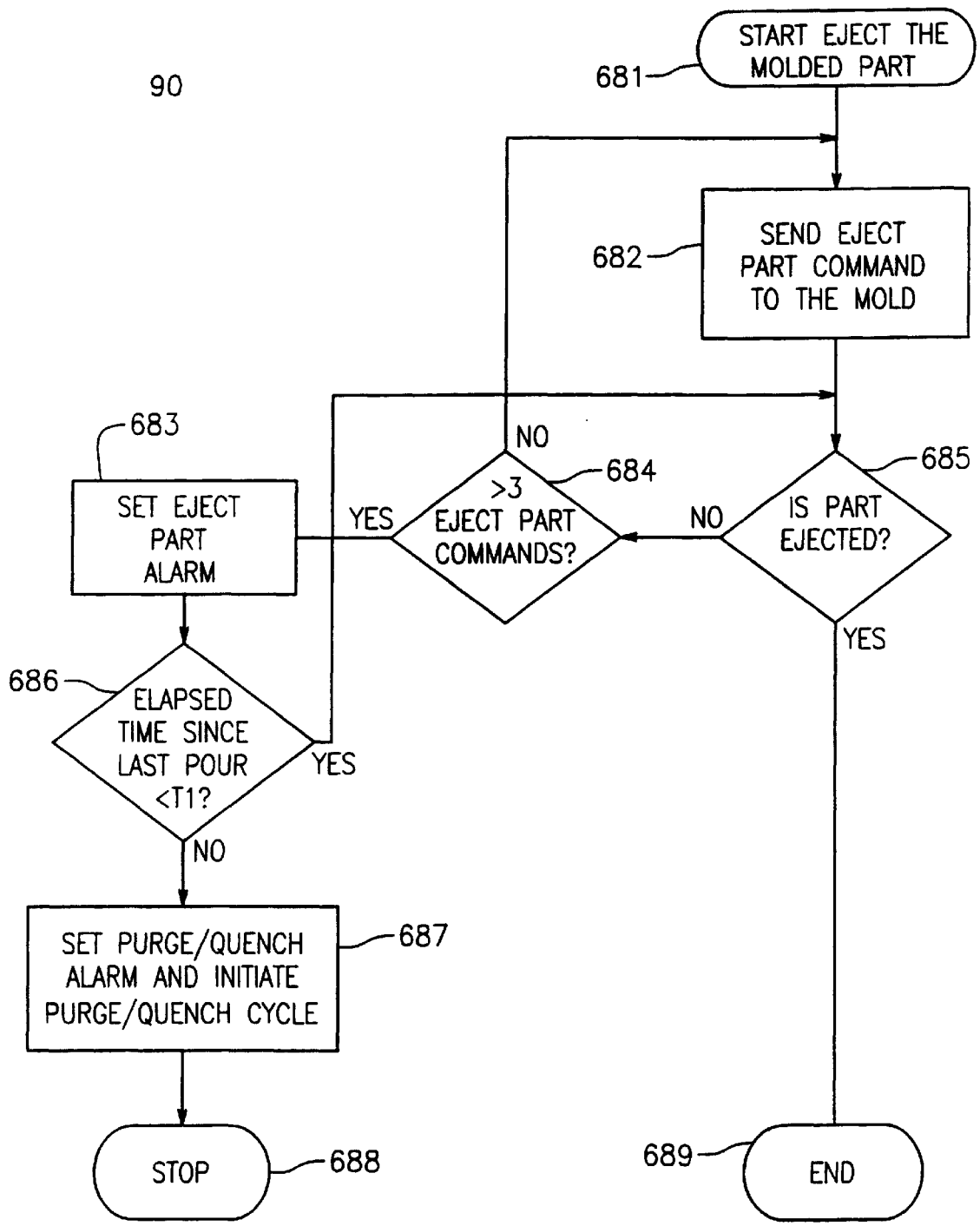
FIG. 10 shows the control sequence for ejecting the molded part from the mold.

Turning now to FIG. 10, FIG. 10 shows the control sequence for ejecting the molded part from the mold 90, (680 in FIG. 6). When the step of ejecting the molded part is started 681, an eject part command is sent to the mold 682. A check is made to determine if the part is ejected 685. If the part is not ejected, the eject part command 682 is repeated for up to three times 684. If the part is not ejected 685 after three contiguous eject part commands 684, an eject part alarm is set 683 and the elapsed time since the last pour is checked to determine if it is less than a preset pour time limit T1 686. If it is not less than the pour time limit T1, a purge/quench alarm is set and a purge/quench cycle is initiated 687, after which the system is stopped 688. If the elapsed time since the last pour is less than the pour time limit T1 686, a check is again made to determine if the part is ejected 685. If the part is ejected 685, the step of ejecting the molded part is ended 689, and the computer program recycles to the step of starting the computer program, 601 in FIG. 6.

The present inventive concept provides a system that significantly improves the rate at which components may be encapsulated and substantially reduces the cost of encapsulation. Tooling costs are also reduced because of the higher polymerization rates involved. Parts costs are also reduced by the elimination of two to four hours curing time of encapsulated components in curing ovens. The chemical delivery subsystems enable long reactant shelf life without refrigeration. Long shelf life is also enabled by the mixing of the feed chemicals in the mix head just prior to being injected into a mold cavity, rather than using premixed materials that may deteriorate while being stored. The system offers improved reliability through elimination of valves in the chemical feed, advanced computer control, a novel mix head design, and no special handling of chemicals by highly trained personnel. The system is especially suitable to small shot sizes such as is required when encapsulating delicate electronic components because of the unique mix head configuration. The delicate electronic components such as microchips that are encapsulated by this system are distinguishable by greater reliability and higher yields due to the use of low viscosity encapsulating materials reducing failures from causes such as wire sweep, and lower molding temperatures for creating less thermal stress than conventional techniques. The chemical material components are also inherently free from residual corrosive substances Although the present invention has been described in considerable detail with reference to certain preferred embodiments thereof, other embodiments are possible. Therefore, the spirit and scope of the appended claims should not be limited to the description of the preferred embodiments herein.

What is claimed is:

1. A mixing and dispensing process for rapidly polymerizing materials, comprising the steps of:

(a) mixing polymerizing materials in a polymerizing mixing means having a sealed annular mixing cavity between a cylindrically-shaped rotating inner mixing spindle and a cylindrically-shaped wall of a mixing body;

(b) delivering a monomer slurry to a monomer slurry feed port in the polymerizing mixing means;

(c) controlling a temperature of the monomer slurry;

(d) delivering a polymerizing initiator to a polymerizing initiator feed port in the polymerizing mixing means;

(e) forming a rapidly polymerizing slurry by combining the monomer slurry and the polymerizing initiator in the polymerizing mixing means; and (f) delivering the rapidly polymerizing slurry to a mold.

2. A mixing and dispensing process for rapidly polymerizing materials, according to claim 1, wherein the step of delivering a monomer slurry comprises the steps of:

(a) mixing the monomer slurry in a monomer slurry mixing means having sealed annular mixing cavity between a cylindrically-shaped rotating inner mixing spindle and a cylindrically-shaped inner wall of a mixing body;

(b) delivering a silica paste to a silica paste feed port in the monomer slurry mixing means;

(c) delivering a monomer to a monomer feed port in the monomer slurry mixing means;

(d) forming the monomer slurry by combining the monomer and the silica paste in the monomer slurry mixing means; and (e) delivering the monomer slurry to the polymerizing mixing means.

3. A mixing and dispensing process for rapidly polymerizing materials, according to claim 2, further comprising the steps of:

(a) delivering a polymerizing quencher to the polymerizing mixing means;

(b) forming a quenched polymerizing slurry by combining the polymerizing quencher and the rapidly polymerizing slurry in the polymerizing mixing means; and (c) delivering the quenched polymerizing slurry to a waste tank.

4. A mixing and dispensing process for rapidly polymerizing materials, according to claim 3, further comprising the step of controlling the silica paste delivering step, the monomer delivering step, the monomer slurry forming step, the polymerizing initiator delivering step, the rapidly polymerizing slurry forming step, the rapidly polymerizing slurry delivering step, the polymerizing quencher delivering step, the quenched polymerizing slurry forming step, and the quenched polymerizing slurry delivering step by a programmable controller.

5. A mixing and dispensing process for rapidly polymerizing materials, according to claim 4, wherein the programmable controller comprises a computer program comprising the steps of:
 (a) checking for system faults;
 (b) executing a pour cycle;
 (c) repositioning the mold;
 (d) ejecting a molded part; and
 (e) repeating steps (a) through (d).

6. A mixing and dispensing process for rapidly polymerizing materials, according to claim 5, wherein the step of checking for system faults comprises the steps of:
 (a) determining if the delivering subsystems are ready;
 (b) setting a purge/quench alarm and initiating a purge/quench cycle if the delivering subsystems are not ready;
 (c) determining if a mix head pressure is zero;
 (d) sending back up commands to the delivering subsystems if the mix head pressure is not zero;
 (e) setting the purge/quench alarm and initiating the purge/quench cycle if more than three contiguous back up commands are sent to the delivering subsystems because of a non-zero mix head pressure;
 (f) determining if an elapsed time since a last pour is less than a predetermined pour time limit and setting the purge/quench alarm and initiating the purge/quench cycle if the elapsed time since the last pour is not less than the predetermined pour time limit;
 (g) determining if a polymer is forming in a mix head;
 (h) setting a polymerizing alarm and enabling an operator to override the polymerizing alarm and restart the step of checking for system faults by repeating steps (a) through (h) if the polymer is not forming in the mix head;
 (i) setting the surge/quench alarm and initiating the purge/quench cycle if an operator does not override the polymerizing alarm;
 (j) determining if the mold is positioned correctly; and
 (k) restarting the step of checking for system faults by repeating steps (a) through (k) if the mold is not positioned correctly.

7. A mixing and dispensing process for rapidly polymerizing materials, according to claim 5, wherein the step of executing the pour cycle comprises the steps of:
 (a) sending an advance tunnel command to an injection tunnel positioning means for positioning an injection tunnel outlet in contact with an inlet of the mold;
 (b) determining if an injection tunnel contacts the mold;
 (c) repeating steps (a) and (b) if the injection tunnel does not contact the mold;
 (d) setting an injection tunnel advance alarm if the injection tunnel does not contact the mold after three contiguous advance tunnel commands;
 (e) determining if an elapsed time since a last pour is less than a predetermined pour time limit and setting a purge/quench alarm and initiating a purge/quench cycle if an operator does not correct the injection tunnel alarm within the predetermined pour time limit;
 (f) beginning pouring by starting the delivering subsystems and resetting a pour timer;
 (g) determining if a mix head pressure is less than a predetermined pressure limit;
 (h) determining if delivered chemical volumes are less than predetermined volume limits;
 (i) repeating steps (f) through (h) if the mix head pressure is less than the predetermined pressure limit and the delivered chemical volumes are less than the predetermined volume limits;
 (j) stopping the pouring by stopping the delivering subsystems and sending back up commands to the delivering subsystems if either the mix head pressure is not less than the predetermined pressure limit or the delivered chemical volumes are not less than the predetermined volume limits;
 (k) determining if delivered chemical ratios are correct;
 (l) setting a ratios alarm if the delivered chemical ratios are not correct;
 (m) setting the purge/quench alarm and initiating the purge/quench cycle if the operator does not reset the ratios alarm after a predetermined ratios alarm time limit;
 (n) determining if the delivered chemical volumes are within predetermined volume ranges;
 (o) setting a volume alarm if the delivered chemical volumes are not within the predetermined volume ranges;
 (p) sending a retract tunnel command to the injection tunnel positioning means;
 (q) determining if the injection tunnel contacts the mold;
 (r) repeating steps (p) and (q) if the injection tunnel continues to contact the mold;
 (s) setting an injection tunnel retract alarm if the injection tunnel does not retract from the mold after three contiguous retract tunnel commands; and
 (t) determining if the elapsed time since the last pour is less than the predetermined pour time limit and setting the purge/quench alarm and initiating the purge/quench cycle if the operator does not correct the injection tunnel retract alarm within the predetermined pour time limit.

8. A mixing and dispensing process for rapidly polymerizing materials, according to claim 5, wherein the step of repositioning the mold comprises the steps of:
 (a) sending a reposition mold command to a mold positioning means;
 (b) determining if the mold is repositioned;
 (c) repeating steps (a) and (b) if the mold is not repositioned;
 (d) setting a mold repositioning alarm if the mold does not reposition after three contiguous reposition mold commands; and
 (e) determining if an elapsed time since a last pour is less than a predetermined pour time limit and setting a purge/quench alarm and initiating a purge/quench cycle if an operator does not correct the mold repositioning alarm within the predetermined pour time limit.

9. A mixing and dispensing process for rapidly polymerizing materials, according to claim 5, wherein the step of ejecting the molded part comprises the steps of:
 (a) sending an eject molded part command to a molded part ejecting means;
 (b) determining if a molded part is ejected;
 (c) repeating steps (a) and (b) if the molded part is not ejected;
 (d) setting an eject part alarm if the molded part does not eject after three contiguous eject molded part commands; and (e) determining if an elapsed time since a last pour is less than a predetermined pour time limit and setting a purge/quench alarm and initiating a purge/quench cycle if an operator does not correct the eject part alarm within the predetermined pour time limit.

10. A mixing and dispensing process for rapidly polymerizing materials, according to claim 2, further comprising the steps of:

(a) controlling a temperature of the silica paste during the step of delivering the silica paste to the monomer slurry mixing means; and (b) controlling a temperature of the monomer during the step of delivering the monomer to the monomer slurry mixing means.

11. A mixing and dispensing process for rapidly polymerizing materials, according to claim 2, further comprising the steps of:

(a) controlling a temperature of the silica paste prior to delivering the silica paste; and (b) controlling a temperature of the monomer prior to delivering the monomer.

12. A mixing and dispensing process for rapidly polymerizing materials, according to claim 1, further comprising the step of controlling a temperature of the rapidly polymerizing slurry in the polymerizing mixing means.

13. A mixing and dispensing process for rapidly polymerizing materials, according to claim 1, further comprising the steps of:

(a) controlling a temperature of the monomer slurry during the step of delivering the monomer slurry to the polymerizing mixing means; and (b) controlling a temperature of the polymerizing initiator during the step of delivering the polymerizing initiator to the polymerizing mixing means.

14. A mixing and dispensing process for rapidly polymerizing materials, according to claim 1, further comprising the steps of:

(a) controlling a temperature of the monomer slurry prior to delivering the monomer slurry; and (b) controlling a temperature of the polymerizing initiator prior to delivering the polymerizing initiator.

15. A mixing and dispensing process for rapidly polymerizing materials, according to claim 1, further comprising the step of controlling the monomer slurry delivering step, the polymerizing initiator delivering step, the rapidly polymerizing slurry forming step, and the rapidly polymerizing slurry delivering step by a programmable controller.

16. A mixing and dispensing system for rapidly polymerizing materials comprising:

(a) means for mixing polymerizing materials having a sealed annular mixing cavity between a cylindrically-shaped rotating inner mixing spindle and a cylindrically-shaped inner wall of a mixing body;

(b) means for delivering a monomer slurry to a monomer slurry feed port in the polymerizing mixing means;

(c) means for controlling a temperature of the monomer slurry;

(d) means for delivering a polymerizing initiator to a polymerizing initiator feed port in the polymerizing mixing means;

(e) means for forming a rapidly polymerizing slurry by combining the monomer slurry and the polymerizing initiator in the polymerizing mixing means; and (f) means for delivering the rapidly polymerizing slurry to a mold.

17. A mixing and dispensing system for rapidly polymerizing materials, according to claim 16, wherein the means for delivering a monomer slurry comprises:

(a) means for mixing the monomer slurry having a sealed annular mixing cavity between a cylindrically-shaped rotating inner mixing spindle and a cylindrically-shaped inner wall of a mixing body;

(b) means for delivering a silica paste to a silica paste feed port in the monomer slurry mixing means;

(c) means for delivering a monomer to a monomer feed port in the monomer slurry mixing means;

(d) means for forming the monomer slurry by combining the monomer and the silica paste in the monomer slurry mixing means; and (e) means for delivering the monomer slurry to the polymerizing mixing means.

18. A mixing and dispensing system for rapidly polymerizing materials, according to claim 17, further comprising:

(a) means for delivering a polymerizing quencher to the polymerizing mixing means;

(b) means for forming a quenched polymerizing slurry by combining the polymerizing quencher and the rapidly polymerizing slurry in the polymerizing mixing means; and (c) means for delivering the quenched polymerizing slurry to a waste tank.

19. A mixing and dispensing system for rapidly polymerizing materials, according to claim 18, further comprising a programmable controller for controlling the silica paste delivering means, the monomer delivering means, the monomer slurry forming means, the polymerizing initiator delivering means, the rapidly polymerizing slurry forming means, the rapidly polymerizing slurry delivering means, the polymerizing quencher delivering means, the quenched polymerizing slurry forming means, and the quenched polymerizing slurry delivering means.

20. A mixing and dispensing system for rapidly polymerizing materials, according to claim 18, wherein the means for delivering the quenched polymerizing slurry to the waste tank comprises a valve.

21. A mixing and dispensing system for rapidly polymerizing materials, according to claim 18, wherein the means for delivering the quenched polymerizing slurry to the waste tank or the rapidly polymerizing slurry to a mold comprises a three-way valve.

22. A mixing and dispensing system for rapidly polymerizing materials, according to claim 18, wherein the means for forming a quenched polymerizing slurry in the polymerizing mixing means comprises a mix head having a sealed annular mixing cavity between a cylindrically-shaped rotating inner mixing spindle and a cylindrically-shaped inner wall of a mixing body.

23. A mixing and dispensing system for rapidly polymerizing materials, according to claim 18, wherein:

(a) the means for forming a monomer slurry in the monomer mixing means comprises a mix head;

(b) the means for delivering the monomer slurry to the polymerizing mixing means comprises the mix head;

(c) the means for forming a rapidly polymerizing slurry in the polymerizing mixing means comprises the mix head; and (d) the means for forming a quenched polymerizing slurry in the polymerizing mixing means comprises the mix head.

24. A mixing and dispensing system for rapidly polymerizing materials, according to claim 22, wherein the mix head comprises:

(a) an electric motor having a drive shaft connected to an input end of a coupling;

(b) a mixing spindle connected to an output end of the coupling and positioned within a sealed mixing cavity within a mixing body by a spindle bearing, the mixing body having a cylindrical-shaped inner wall;

(c) an upper annular spacing in the mixing cavity between an upper section of the mixing spindle and an upper section of the mixing body, forming a monomer slurry mixing annulus;

(d) a lower annular spacing in the mixing cavity between a lower section of the mixing spindle and a lower section of the mixing body, forming a polymerizing slurry mixing annulus;

(e) a monomer feed port connected to the monomer delivering means and positioned in the mixing body wall at the monomer slurry mixing annulus for injecting a monomer into the monomer slurry mixing annulus;

(f) a silica paste feed port connected to the silica paste delivering means and positioned in the mixing body wall at the monomer slurry mixing annulus for injecting a silica paste into the monomer slurry mixing annulus;

(g) a polymerizing initiator feed port connected to the polymerizing initiator delivering means and positioned in the mixing body wall at the polymerizing slurry mixing annulus for injecting a polymerizing initiator into the polymerizing slurry mixing annulus;

(h) a polymerizing quencher feed port connected to the polymerizing quencher delivering means and positioned in the mixing body wall at the polymerizing slurry mixing annulus for injecting a polymerizing quencher into the polymerizing slurry mixing annulus; and (i) an output port positioned in the bottom of the mixing body opposite the coupling below the polymerizing slurry mixing annulus for ejecting a polymerizing slurry from the mixing cavity.

25. A mixing and dispensing system for rapidly polymerizing materials, according to claim 24, wherein the mix head further comprises a pressure sensor positioned in the mixing body wall for determining when the mold is filled with the rapidly polymerizing slurry.

26. A mixing and dispensing system for rapidly polymerizing materials, according to claim 24, wherein the mix head further comprises a light port positioned in the mixing body wall below the polymerizing slurry mixing annulus for use of a light sensing probe for determining the polymerizing slurry characteristics.

27. A mixing and dispensing system for rapidly polymerizing materials, according to claim 24, wherein:

(a) the mix head further comprises a light port positioned in the mixing body wall below the polymerizing slurry mixing annulus for use of a radiation source in initiating polymerization of a photo-curable monomer slurry;

(b) the polymerizing initiator feed port is deleted from the mixing body wall; and (c) the polymerizing initiator delivering means is eliminated.

28. A mixing and dispensing system for rapidly polymerizing materials, according to claim 24, wherein the electric motor is a high, variable speed electric motor.

29. A mixing and dispensing system for rapidly polymerizing materials, according to claim 24, wherein the coupling is a sealed magnetic coupling.

30. A mixing and dispensing system for rapidly polymerizing materials, according to claim 24, wherein the mixing spindle bearing is sealed.

31. A mixing and dispensing system for rapidly polymerizing materials, according to claim 24, further comprising a means for heating the polymerizing slurry at the output port of the mixing cavity.

32. A mixing and dispensing system for rapidly polymerizing materials, according to claim 24, wherein the monomer feed port and the silica paste feed port are replaced by a single monomer slurry feed port connected to the monomer slurry delivering means and positioned in the mixing body wall above the polymerizing slurry mixing annulus for injecting a premixed slurry of monomer and silica paste into the mixing cavity.

33. A mixing and dispensing system for rapidly polymerizing materials, according to claim 24, further comprising a three-way valve having an input connected to the output port of the mixing cavity, a first output connected to the mold, and a second output connected to the waste tank.

34. A mixing and dispensing system for rapidly polymerizing materials, according to claim 17, wherein the means for forming the monomer slurry in the monomer mixing means and means for delivering the monomer slurry to the polymerizing mixing means comprise a mix head having a sealed annular mixing cavity between a cylindrically-shaped rotating inner mixing spindle and a cylindrically-shaped inner wall of a mixing body.

35. A mixing and dispensing system for rapidly polymerizing materials, according to claim 17, further comprising:

(a) means for controlling a temperature of the silica paste interposed between the means for delivering the silica paste and the monomer slurry mixing means; and (b) means for controlling a temperature of the monomer interposed between the means for delivering the monomer and the monomer slurry mixing means.

36. A mixing and dispensing system for rapidly polymerizing materials, according to claim 17, further comprising:

(a) means for controlling a temperature of the silica paste at the means for delivering the silica paste; and (b) means for controlling a temperature of the monomer at the means for delivering the monomer.

37. A mixing and dispensing system for rapidly polymerizing materials, according to claim 16, further comprising a programmable controller for controlling the monomer slurry delivering means, the polymerizing initiator delivering means, the rapidly polymerizing slurry forming means, and the rapidly polymerizing slurry delivering means.

38. A mixing and dispensing system for rapidly polymerizing materials, according to claim 16, wherein the means for delivering the rapidly polymerizing slurry to the mold comprises a valve.

39. A mixing and dispensing system for rapidly polymerizing materials, according to claim 16, wherein the means for forming a rapidly polymerizing slurry in the polymerizing mixing means comprises a mix head having a sealed annular mixing cavity between a cylindrically-shaped rotating inner mixing spindle and a cylindrically-shaped inner wall of a mixing body.

40. A mixing and dispensing system for rapidly polymerizing materials, according to claim 16, further comprising means for controlling a temperature of the rapidly polymerizing slurry in the polymerizing mixing means.

41. A mixing and dispensing system for rapidly polymerizing materials, according to claim 16, further comprising:

(a) means for controlling a temperature of the monomer slurry interposed between the means for delivering the monomer slurry and the polymerizing mixing means; and (b) means for controlling a temperature of the polymerizing initiator interposed between the means for delivering the polymerizing initiator and the polymerizing mixing means.

42. A mixing and dispensing system for rapidly polymerizing materials, according to claim 16, further comprising:
    (a) means for controlling a temperature of the monomer slurry at the means for delivering the monomer slurry; and
    (b) means for controlling a temperature of the polymerizing initiator at the means for delivering the polymerizing initiator.

43. A mixing and dispensing system for rapidly polymerizing materials, comprising:
    (a) a mix head having a variable speed electric motor coupled to a mixing spindle positioned within a sealed mixing cavity within a mixing body having a cylindrical-shaped inner wall, the electric motor being positioned at a first end of the mixing body;
    (b) a monomer feed port connected to a monomer delivering subsystem and positioned in the mixing body wall;
    (c) a silica paste feed port connected to a silica paste delivering subsystem and positioned in the mixing body wall;
    (d) a polymerizing initiator feed port connected to a polymerizing initiator delivering subsystem and positioned in the mixing body wall;
    (e) a polymerizing quencher feed port connected to a polymerizing quencher delivering subsystem and positioned in the mixing body wall;
    (f) a pressure sensor positioned in the mixing body wall for determining mix head pressure;
    (g) an outlet port positioned at a second end of the mixing body opposite the electric motor, and being connected to an input of a three-way valve;
    (h) a first output of the three-way valve being connected to an inlet of an injection tunnel, and a second output of the three-way valve being connected to a waste tank;
    (i) a means for positioning a mold in relation to the mix head;
    (j) a means for positioning the injector tunnel so that an injector tunnel outlet is in contact with an inlet of the mold;
    (k) a means for ejecting a molded part from the mold; and
    (l) a programmable controller connected to the monomer delivering subsystem, the silica paste delivering subsystem, the polymerizing initiator delivering subsystem, the polymerizing quencher delivering subsystem, the variable speed electric motor, the pressure sensor, the three-way valve, the mold positioning means, the injector tunnel positioning means, and the molded part ejecting means.

44. An encapsulated device, comprising a device positioned within a mold and enclosed within an encapsulating material, the encapsulating material prepared by a process comprising the steps of:
    (a) mixing polymerizing materials in a polymerizing mixing means having a sealed annular mixing cavity between a cylindrically-shaped rotating inner mixing spindle and a cylindrically-shaped inner wall of a mixing body;
    (b) delivering a monomer slurry to a monomer slurry feed port in the polymerizing mixing means;
    (c) controlling a temperature of the monomer slurry;
    (d) delivering a polymerizing initiator to a polymerizing initiator feed port in the polymerizing mixing means;
    (e) forming a rapidly polymerizing slurry by combining the monomer slurry and the polymerizing initiator in the polymerizing mixing means; and
    (f) delivering the rapidly polymerizing slurry to a mold.

45. An encapsulated device, comprising a device positioned within a mold and enclosed within an encapsulating material, the encapsulating material prepared by the process according to claim 44, wherein the step of delivering a monomer slurry comprises the steps of:
    (a) mixing the monomer slurry in a monomer slurry mixing means having sealed annular mixing cavity between a cylindrically-shaped rotating inner mixing spindle and a cylindrically-shaped inner wall of a mixing body;
    (b) delivering a silica paste to a silica paste feed port in the monomer slurry mixing means;
    (c) delivering a monomer to a monomer feed port in the monomer slurry mixing means;
    (d) forming the monomer slurry by combining the monomer and the silica paste in the monomer slurry mixing means; and
    (e) delivering the monomer slurry to the polymerizing mixing means.

46. An encapsulated device, comprising a device positioned within a mold and enclosed within an encapsulating material, the encapsulating material prepared by a process according to claim 45, further comprising the steps of:
    (a) delivering a polymerizing quencher to the polymerizing mixing means;
    (b) forming a quenched polymerizing slurry by combining the polymerizing quencher and the rapidly polymerizing slurry in the polymerizing mixing means; and
    (c) delivering the quenched polymerizing slurry to a waste tank.

47. An encapsulated device, comprising a device positioned within a mold and enclosed within an encapsulating material, the encapsulating material prepared by a process according to claim 46, further comprising the step of controlling the silica paste delivering step, the monomer delivering step, the monomer slurry forming step, the polymerizing initiator delivering step, the rapidly polymerizing slurry forming step, the rapidly polymerizing slurry delivering step, the polymerizing quencher delivering step, the quenched polymerizing slurry forming step, and the quenched polymerizing slurry delivering step by a computer program residing in a programmable controller.

48. An encapsulated device, comprising a device positioned within a mold and enclosed within an encapsulating material, the encapsulating material prepared by a process according to claim 47, wherein the computer program residing in the programmable controller comprises the steps of:
    (a) checking for system faults;
    (b) executing a pour cycle;
    (c) repositioning the mold;
    (d) ejecting a molded part; and
    (e) repeating steps (a) through (d).

49. An encapsulated device, comprising a device positioned within a mold and enclosed within an encapsulating material, the encapsulating material prepared by a process according to claim 44, further comprising the step of controlling the monomer slurry delivering step, the polymerizing initiator delivering step, the rapidly polymerizing slurry forming step, and the rapidly polymerizing slurry delivering step by a computer program residing in a programmable controller.

* * * * *